(12) United States Patent
Miura et al.

(10) Patent No.: US 8,805,028 B2
(45) Date of Patent: Aug. 12, 2014

(54) PERSONAL IDENTIFICATION DEVICE USING VESSEL PATTERN OF FINGERS

(75) Inventors: Naoto Miura, Kokubunji (JP);
Takafumi Miyatake, Hachioji (JP);
Akio Nagasaka, Kokubunji (JP);
Harumi Kiyomizu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1066 days.

(21) Appl. No.: 11/492,895

(22) Filed: Jul. 26, 2006

(65) Prior Publication Data

US 2007/0058841 A1 Mar. 15, 2007

(30) Foreign Application Priority Data

Sep. 14, 2005 (JP) .................. 2005-266218

(51) Int. Cl.
*G06K 9/00* (2006.01)
*G05B 19/00* (2006.01)

(52) U.S. Cl.
USPC ........................................ 382/115; 340/5.52

(58) Field of Classification Search
None
See application file for complete search history.

(56) References Cited

U.S. PATENT DOCUMENTS

| | | | |
|---|---|---|---|
| 5,787,185 A | 7/1998 | Clayden | |
| 5,793,881 A | 8/1998 | Stiver et al. | |
| 5,862,246 A | 1/1999 | Colbert | |
| 6,327,376 B1 | 12/2001 | Harkin | |
| 6,993,160 B2 | 1/2006 | Miura et al. | |
| 7,181,048 B2 | 2/2007 | Blume | |
| 7,273,170 B2 | 9/2007 | Katsumata et al. | |
| 7,327,561 B2 | 2/2008 | Chen | |
| 7,327,861 B2 | 2/2008 | Choshi et al. | |
| 7,359,531 B2 | 4/2008 | Endoh et al. | |
| 7,376,839 B2 | 5/2008 | Carta et al. | |
| 2002/0028004 A1* | 3/2002 | Miura et al. .................. | 382/124 |
| 2002/0067845 A1 | 6/2002 | Griffis | |
| 2003/0086588 A1 | 5/2003 | Shinada et al. | |
| 2003/0103686 A1 | 6/2003 | Ogura | |
| 2004/0031908 A1 | 2/2004 | Neveux et al. | |
| 2004/0071322 A1 | 4/2004 | Choshi et al. | |
| 2004/0120556 A1* | 6/2004 | Kono et al. .................. | 382/124 |
| 2004/0184641 A1* | 9/2004 | Nagasaka et al. ............. | 382/124 |
| 2004/0228508 A1* | 11/2004 | Shigeta ......................... | 382/124 |
| 2005/0047632 A1* | 3/2005 | Miura et al. .................. | 382/124 |
| 2005/0148876 A1 | 7/2005 | Endoh et al. | |
| 2005/0205667 A1 | 9/2005 | Rowe | |

(Continued)

FOREIGN PATENT DOCUMENTS

DE 44 21 237 A1 12/1994
EP 976 897 A1 2/2000

(Continued)

OTHER PUBLICATIONS

U.S. Appl. No. 11/492,788, filed Jul. 26, 2006, N. Miura et al.

*Primary Examiner* — Kim Vu
*Assistant Examiner* — Fred Hu
(74) *Attorney, Agent, or Firm* — Mattingly & Malur, PC

(57) ABSTRACT

Personal identification is implemented by picking up finger vein patterns when the user naturally grasps a grip such as doorknob. The device for personal identification has a light source provided to irradiate light on the finger from the palm side, a camera to pick up the vessel image of the finger, and a processor to extract features of the vessel from the image and compare the obtained features with the registered ones. The camera picks up the light that exits from the backside of the finger after penetrating it.

14 Claims, 22 Drawing Sheets

(56) References Cited

U.S. PATENT DOCUMENTS

| | | |
|---|---|---|
| 2005/0281442 A1 | 12/2005 | Miura et al. |
| 2006/0023919 A1 | 2/2006 | Okamura et al. |
| 2007/0036399 A1 | 2/2007 | Matsumura et al. |
| 2008/0115981 A1 | 5/2008 | Bechtel |

FOREIGN PATENT DOCUMENTS

| | | | |
|---|---|---|---|
| EP | 1 271 389 A2 | | 1/2003 |
| EP | 1 376 465 A1 | | 1/2004 |
| EP | 1376465 A1 | * | 1/2004 |
| EP | 1708135 A1 | * | 10/2006 |
| JP | 2001-184507 | | 7/2001 |
| JP | 2001-510597 A | | 7/2001 |
| JP | 2002-83300 | | 3/2002 |
| JP | 2003-085539 A | | 3/2003 |
| JP | 2003-242492 | | 8/2003 |
| JP | 2004-086866 | | 3/2004 |
| JP | 2004-131927 | | 4/2004 |
| JP | 2004-265369 | | 9/2004 |
| KR | 2002-0020184 A | | 3/2002 |
| TW | I236635 | | 7/2005 |
| WO | 00/39743 A1 | | 7/2000 |
| WO | 00/39744 A1 | | 7/2000 |
| WO | WO 02/099393 | | 12/2002 |
| WO | 2005/013183 A2 | | 2/2005 |
| WO | 2005/017828 | | 2/2005 |
| WO | WO 2005069212 A1 | * | 7/2005 |
| WO | WO 2006/134669 A1 | | 12/2006 |

\* cited by examiner

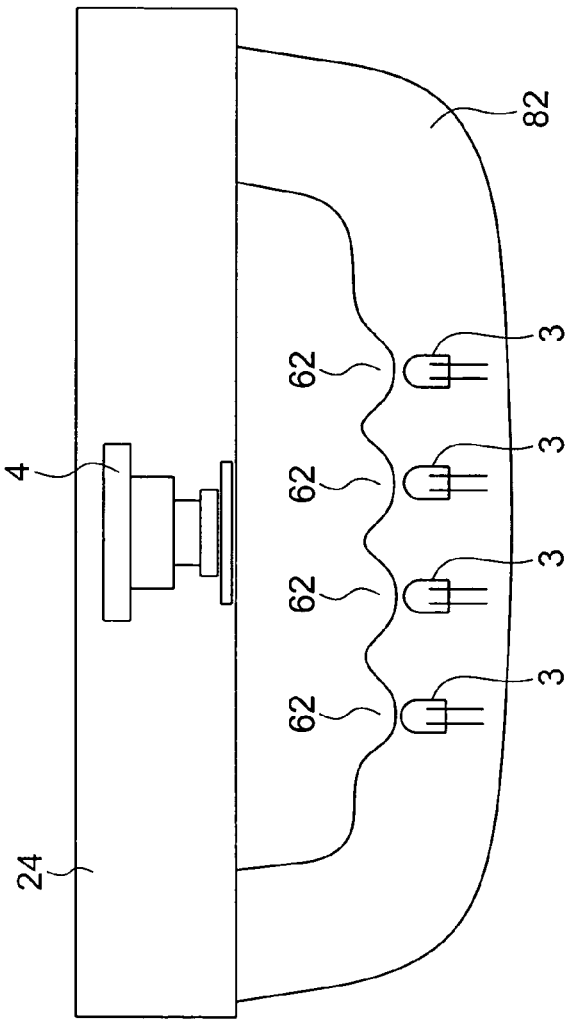
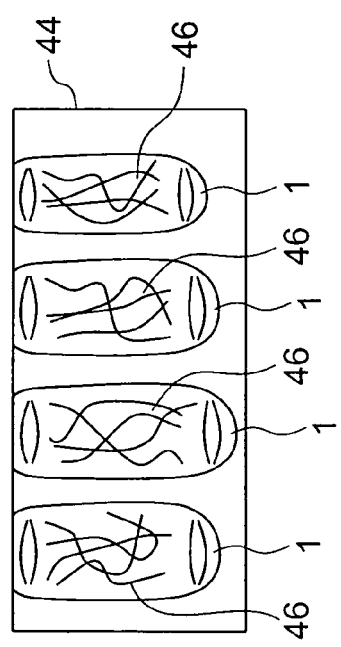

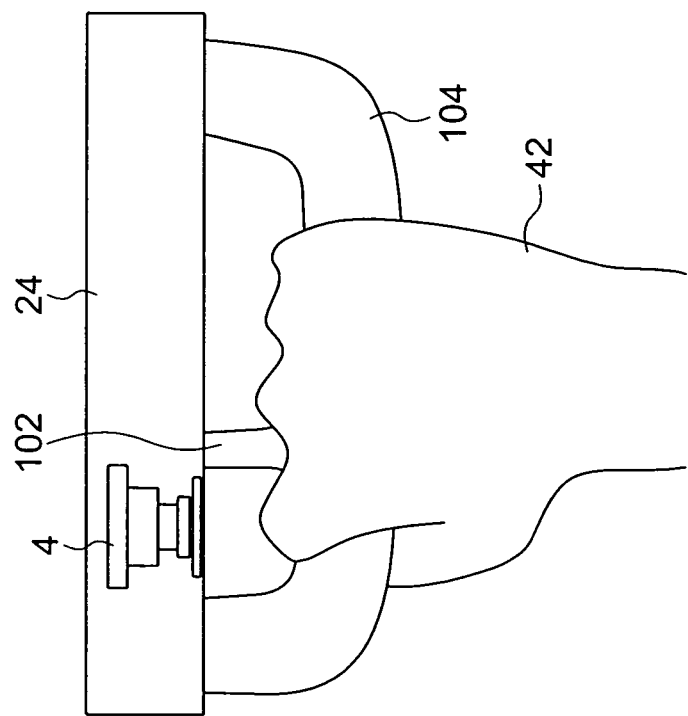
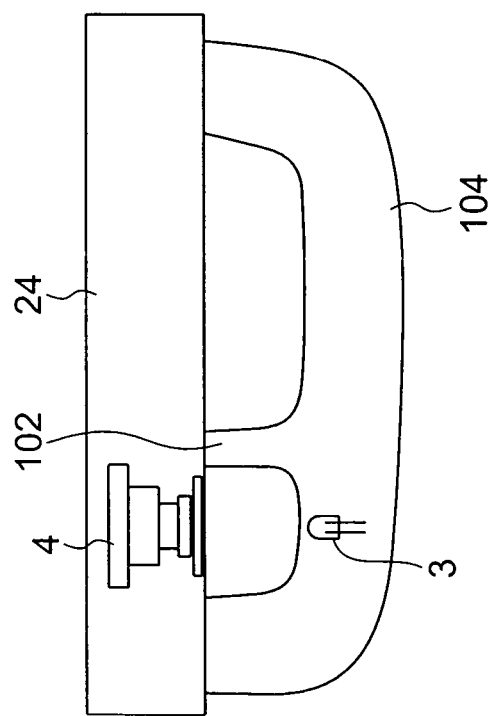

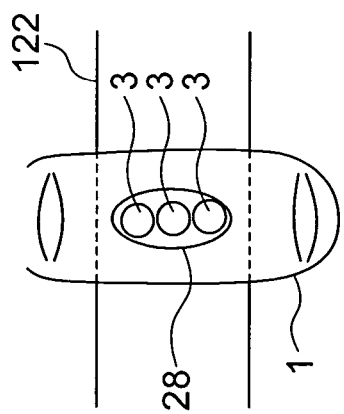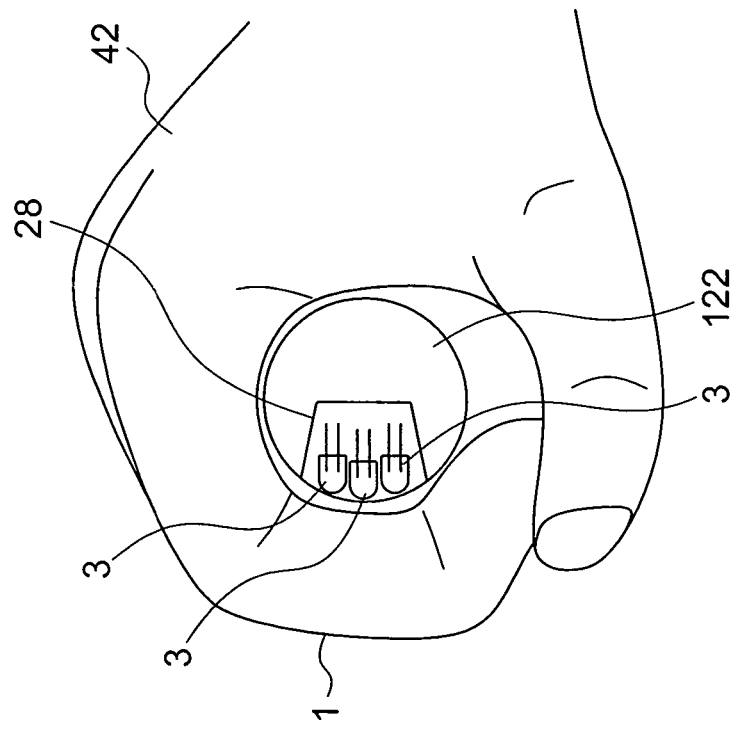

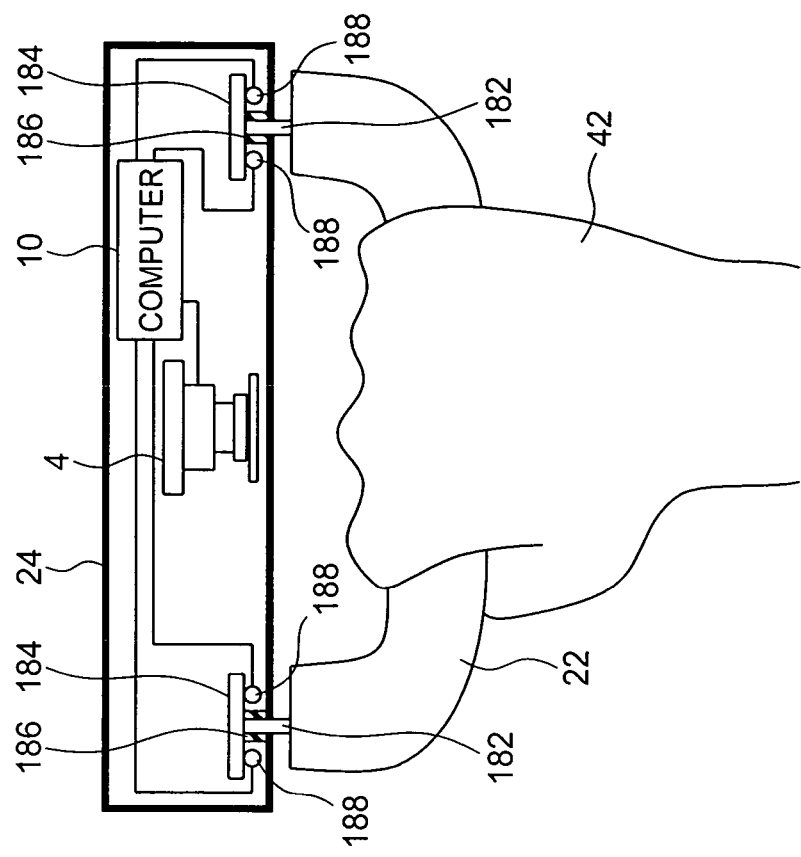
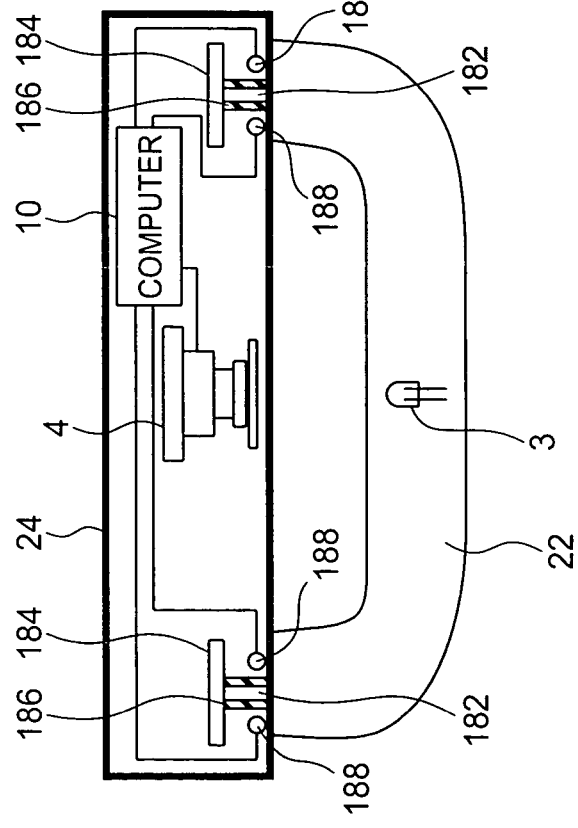
FIG. 10A
FIG. 10B

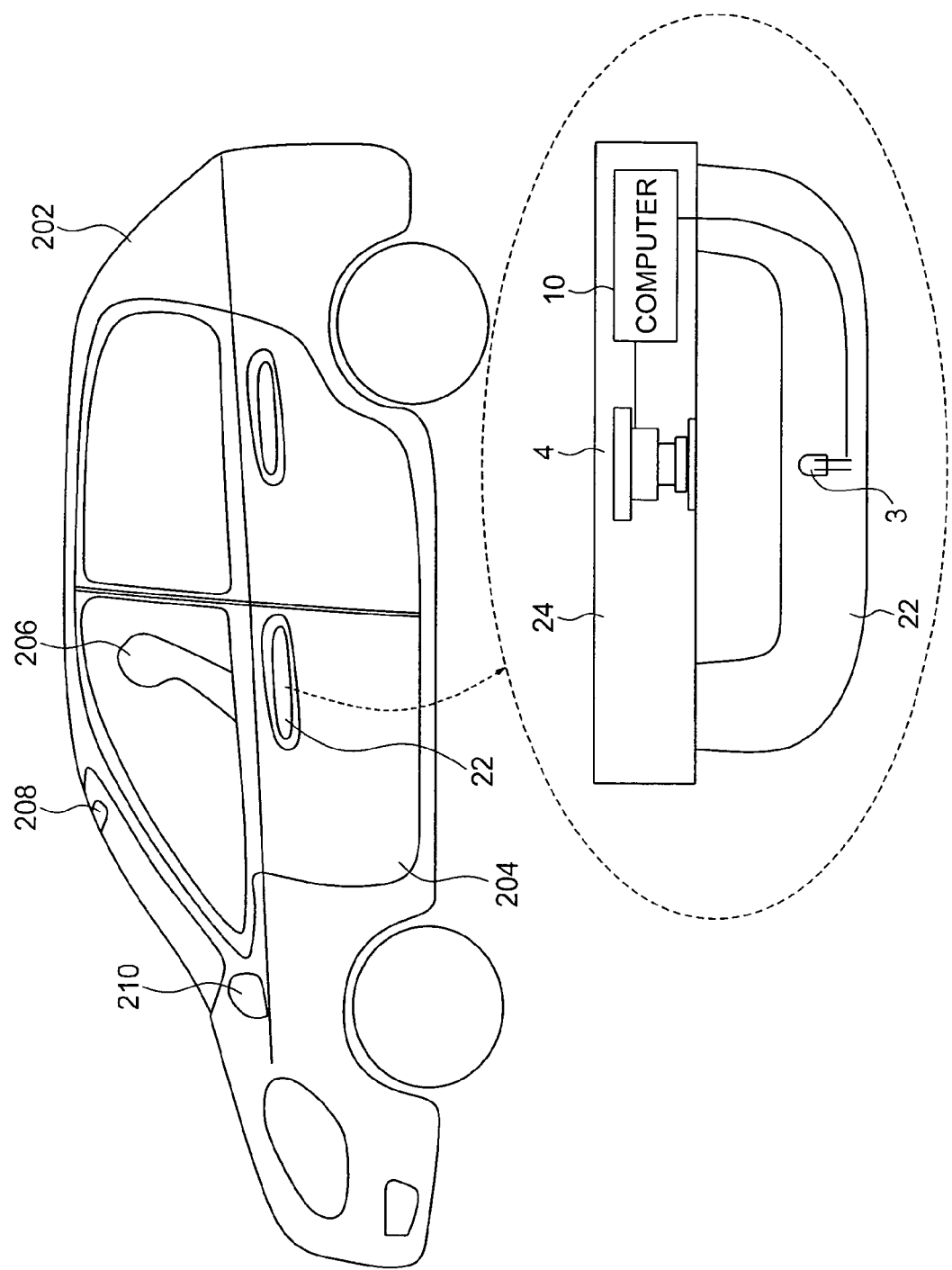

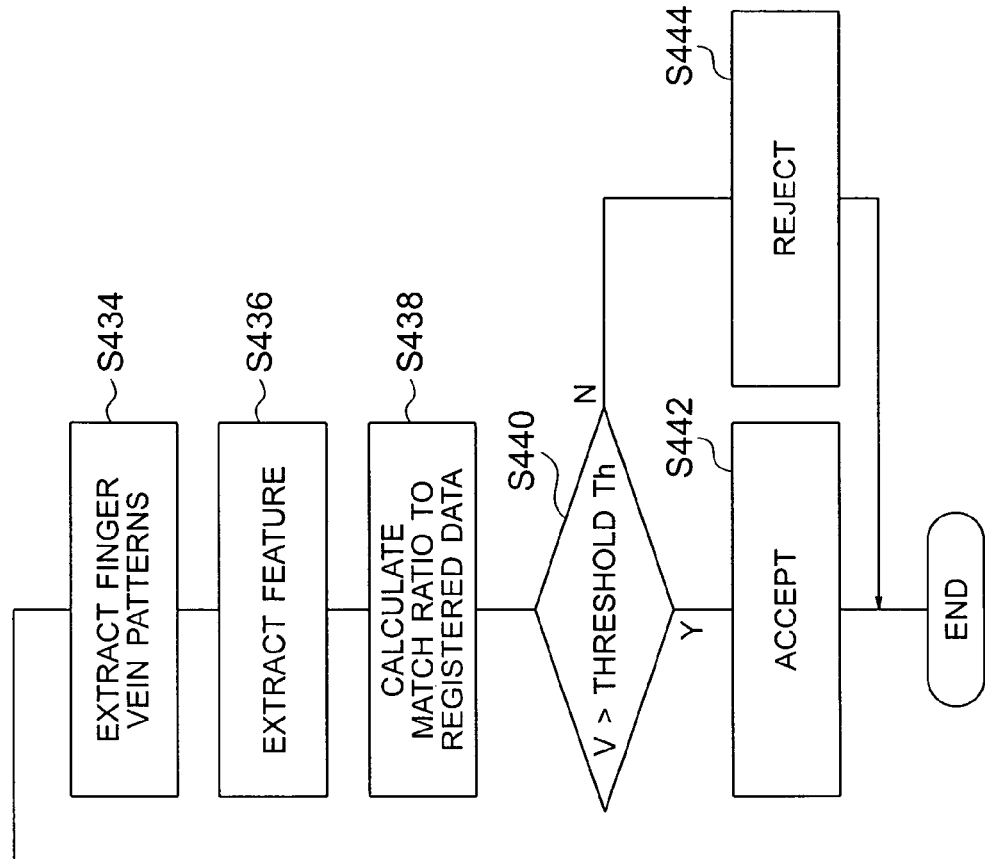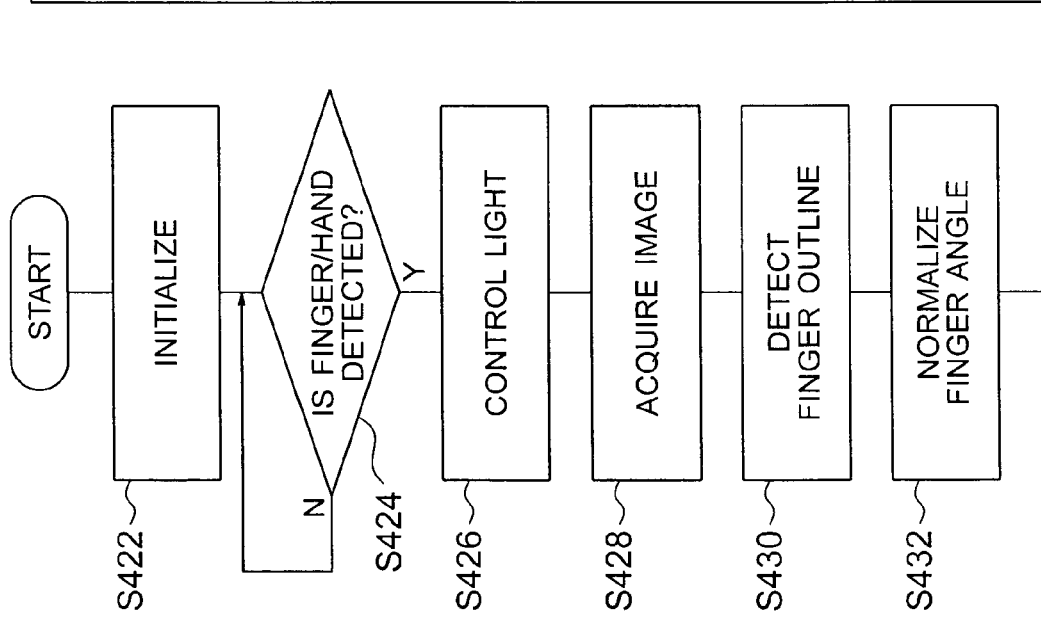
FIG. 22

PERSONAL IDENTIFICATION DEVICE USING VESSEL PATTERN OF FINGERS

INCORPORATION BY REFERENCE

The present application claims priority from Japanese application JP 2005-266218 filed on Sep. 14, 2005, the content of which is hereby incorporated by reference into this application.

BACKGROUND OF THE INVENTION

The present invention relates to a personal identification device and method for identifying individuals by using patterns of human blood vessels, and particularly to biological authentication using blood vessels of finger.

People have attached a high value to the technology of security for personal belongings and information, while the biometrics authentication using human body information has attracted people's attention as a personal identification technology excellent in convenience and confidentiality. The conventional biometrics authentication techniques have so far been devised that employ fingerprints, iris, voice, faces, veins of the palm and back of the hand, and veins of fingers. Particularly in the authentication technique using veins of finger, the user simply holds his or her finger forth in order to be authenticated, and thus the authentication act almost does not make things psychologically uncomfortable. In addition, because of using organic interior information, this technique is strong against the falsification.

The authentication using veins of finger can be implemented as follows. When infrared light is irradiated on a finger, it is scattered within the finger and it exits to the outside. At this time, because the hemoglobin within the blood more absorbs the infrared light than the nearby tissue, the image of light passing through the finger cushion is picked up. Thus, the vessels distributed under the skin of the finger cushion, or the veins of finger can be visualized as a pattern of dark shadow. The characteristics data of the vein pattern of finger is previously read from this image and registered. When a finger is presented for inspection, the characteristics data of the vein pattern can be obtained from the image of the finger and compared with the registered one. Thus, the personal authentication can be made by the judgment of whether the examined finger is just the registrant's one. The biometrics has so far been employed for the entrance and exit management, clock-in clock-out management, PC login, ATM and so on. In most of these applications, the authentication terminal was separately provided at around the facility necessary for the authentication or embedded as a separate module. Thus, it was necessary to complete the authentication process before the essentially desired operations. Particularly in the entrance and exit management, the authentication process as another separate operation is also included in addition to such an intuitive operation as to open a door unlike the application field such as ATM and PC in which constant input operations are required. Thus, in this aspect, the convenience is reduced. For example, there is proposed a method to authenticate under the condition that the user grasps the knob of a door at which a finger vein authentication device is provided (for example, see JP-A-2001-184507). In addition, there is another method to authenticate under the condition that the user grasps the grip having an infrared LED provided to pick up the image of the vein pattern on the back side of the hand (for example, see JP-A-2003-242492).

SUMMARY OF THE INVENTION

In the conventional technique that provides the authentication device on the handgrip, the skin on the palm side of the fingers sags when gripping the doorknob, thus distorting the finger's veins on the palm side to make it difficult to authenticate with stability. In addition, since the fingers are bent, the finger's veins at the joints cannot be properly photographed. Therefore, the amount of information enough to identify individuals is decreased, causing the recognition rate to be reduced. Moreover, in the conventional technique to pick up the image of the vein pattern on the backside of the hand, it was necessary to provide a camera on the top of the doorknob. Consequently, the door needs another raised structure than the doorknob, thus making it difficult to reduce the size of the device. It is an objective of the invention to achieve the personal identification with excellent convenience and accuracy by clearly picking up the image of the finger's vein pattern during the natural operation to grasp the grip such as doorknob.

The summary of the typical example of the invention disclosed in this application is as follows.

That is, there is provided a personal identification device that includes a grip having a curvature suited to fully grasp by hand, a light source for irradiating light from the palm side onto the fingers that is held around the grip, a camera for receiving the light passed through the fingers from the light source, and a processor for extracting the vessel pattern from the picked-up image and making the process for the personal identification. Particularly, the camera is provided to oppose the light source with the fingers interposed between the camera and the light source and to pick up the image of the backside of the fingers.

Thus, the present invention is able to implement the personal identification with high security during such natural operation as to smoothly grasp the grip when the user opens the door.

Other objects, features and advantages of the invention will become apparent from the following description of the embodiments of the invention taken in conjunction with the accompanying drawings.

BRIEF DESCRIPTION OF THE DRAWINGS

FIGS. 5A and 5B are diagrams showing an example of the construction of another grip-type finger-vein identification device having a plurality of grooves for alignment of fingers.

FIGS. 6A and 6B are diagrams showing an example of the construction of another grip-type finger-vein identification device having a bar for alignment of fingers.

FIGS. 7A and 7B are diagrams showing an example of the construction of another grip-type finger-vein identification device having light sources arranged in the longitudinal direction of fingers.

FIGS. 10A and 10B are diagrams showing an example of the construction of another grip-type finger-vein identification device that is actuated to start authentication by pulling the grip.

FIG. 11 is a diagram showing an example of the construction of another grip-type finger-vein identification device that is incorporated in the door of an automobile.

FIG. 22 is a flowchart showing an example of the flow of the authentication process in the grip-type finger-vein identification device.

DESCRIPTION OF THE EMBODIMENTS

Embodiments of the invention will be described in detail.

Figure 1:
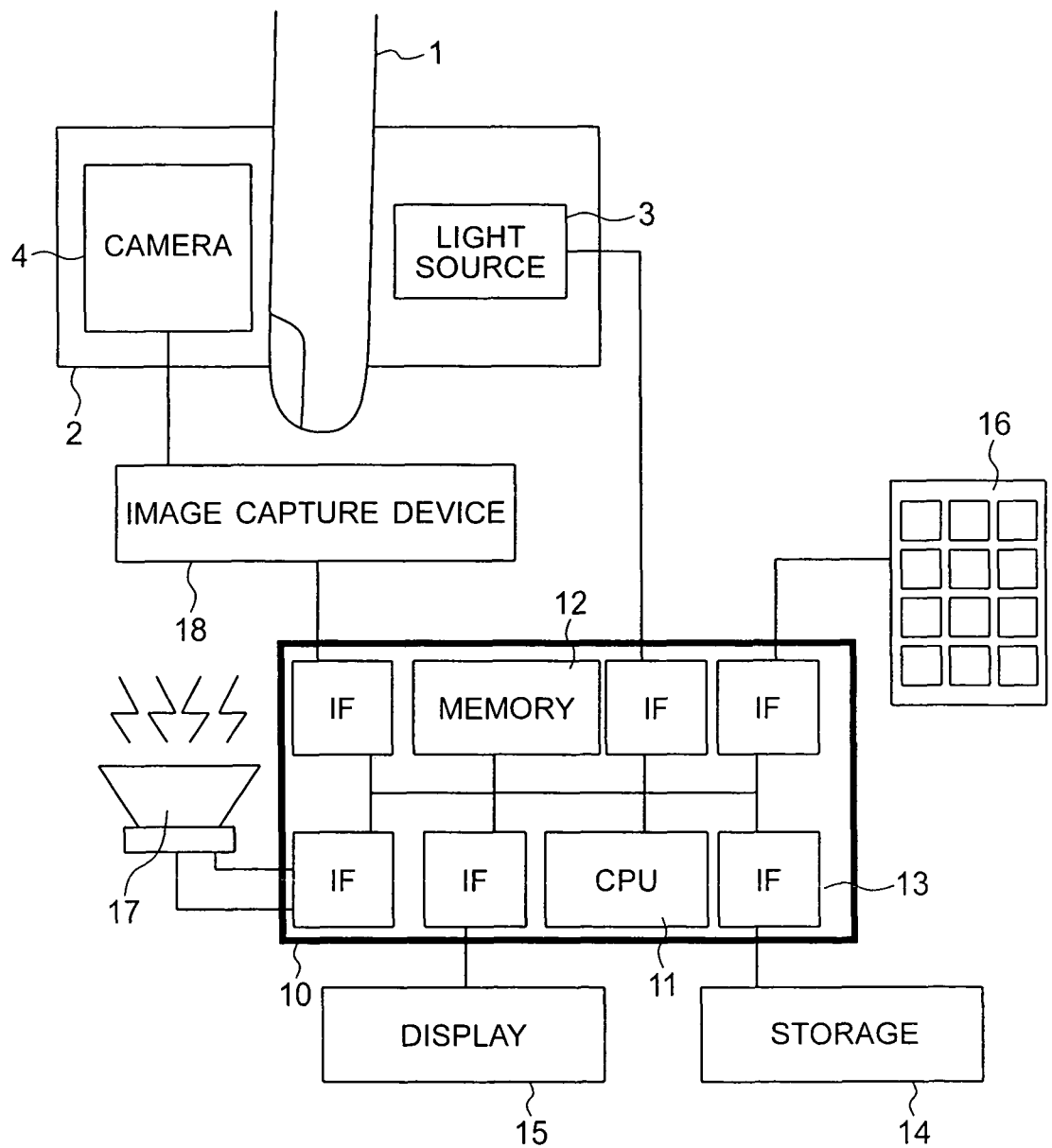
FIG. 1 is a diagram showing an example of the system construction of an identification device for embodying the invention.

FIG. 1 is a block diagram of the system construction for actualizing the invention. At the authentication time, the user puts out a finger 1 into an input unit 2 for finger vein pattern. At this time, a light source 3 irradiates light on the finger 1. The light is scattered within the finger 1, and passed through the finger 1. A camera 4 picks up the light exiting from the palm side, and converts it into an electric signal. The signal is supplied through an image capture device 18 and received as an image by a computer 10. The received image is once stored in a memory 12. Then, a previously registered finger vein image is supplied from storage 14 through an interface 13 to the memory 12, where it is stored. A CPU 11 executes a program stored in the memory 12 to compare the registered image and the inputted image. This comparing process may also be made by using another CPU, memory and storage device incorporated in a device such as IC card. In this case, the computer 10 has an interface provided for the IC card reader. The inputted image is read in the IC card and processed to compare within the IC card. At this time, the user may enter personal identification information such as ID number or password on an information input unit 16. In this case, only the registered image associated with this information is supplied to and processed by the memory 12. Thus, it is possible to reduce the comparing time and suppress the erroneous recognition. The comparing process computes the value of correlation between the two images, and judges whether the inputted image coincides with the registered image according to the correlation value. The personal identification can be made based on this result. If the user is successfully authenticated, the authentication system performs the process on the object to be controlled at the certification time. At this time, display 15 or a loud speaker 17 may be acted to indicate the authentication result.

While the light source 3 and camera 4 are united as the input unit 2 in this system construction, the computer 10 and image capture device 18 may be separately provided from the input unit 2 without being combined with the input unit 2. From the security viewpoint, it is desired to integrate all the components in order to prevent from the interception through communication lines. In addition, the display 15, input means 16 and loudspeaker 17 may be arbitrarily provided. When the memory 12 is nonvolatile and has enough capacity, it can also be used in place of the storage 14, and thus the storage 14 can be omitted.

Figure 2:
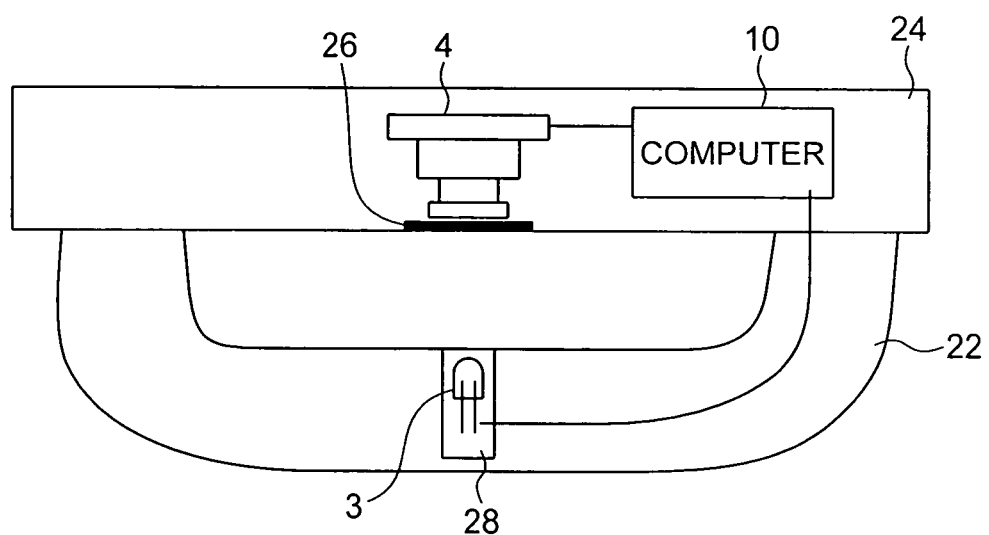
FIG. 2 is a diagram showing an example of the construction a grip-type finger-vein identification device.

FIG. 2 shows an example of the construction of a grip-type finger vein authentication device that can implement personal identification by grasping a grip. A grip 22 has bored therein a hole 28 for light source in which the light source 3 can be provided. The hole 28 for light source may be provided with a member of transparent material such as an acrylic sheet that can allow infrared light to be passed through and protect the light source 3. The grip 22 is mounted to a grip support 24. The grip support 24 has the camera 4 provided therein to oppose the light source 3. The grip support 24 is normally embedded within a knob-provided object such as a door. The light radiated from the light source 3 passes through an infrared light penetrating filter 26 and arrives at the camera 4. The light source 3 may be an LED, halogen lamp, laser or the like to emit infrared light. The camera 4 may be a CCD camera, CMOS camera or the like that has the sensitivity to infrared light. The infrared light penetrating filter 26 has the effects to allow only the waves of infrared light to be passed through but to block the other unnecessary external light.

This device picks up the finger vein pattern when the user grips the handle, and compares it with the registered pattern so that the personal identification can be made. Particularly this invention is applied to the location where the grip 22 is naturally grasped, for example, to the doorknob that needs the entrance and exit management. Therefore, no special manipulation is necessary for the authentication, and thus the convenience for the user can be enhanced. In this case, the grip 22 is mounted on a door as the doorknob. The light source 3 is provided within the doorknob, and the camera 4 within the door body. If this invention is applied to a device to use in a gripped state like a pistol or power saw, the light source 3 is provided within the grip to actuate the identification device, and the camera 4 within the device body so that the user can operate this tool just when the user is identified. This identification device can also be provided as a single unit and used in various situations necessary for personal identification such as entrance and exit management, PC login, and ATM.

In this construction, the infrared light source 3 and the camera 4 are mounted to oppose so that the camera 4 can pick up the penetration image of the fingers inserted in the space between the grip 22 and the grip support 24. The fingers are normally inserted between the grip 22 and the grip support 24. Thus, the construction of this application using the finger vein can make authentication by user's smoother operation as compared with the conventional identification device using the backside of the hand. Accordingly, the identification device of the invention can be constructed without changing from the conventional interface of the doorknob. In this aspect, the structure using the penetrated light needs to provide the light source in such a location that the transmitted light from the object to be identified can be picked up by the camera. Therefore, when the backside of the hand is to be picked up, a necessary structure might be projected from the grip support in order to provide the camera, and thus this structure will need to improve the conventional interface.

In addition, the camera 4 exists on the grip support 24 not on the grip 22. When the camera 4 and light source 4 are provided on the grip 22 side and grip support 24 side, respectively, user's grasping the grip 22 will result in the camera's picking up of the palm-side vein pattern. However, since the fingers are bent on the palm side when the user grasps the grip 22, the finger veins of the joints are hidden inside the fingers. Also, when the user grasps the grip 22, the fingers are pressed against the grip, and thus the vein pattern might disappear due to the application of the pressure on the palm-side finger surfaces. For these reasons, the information for the personal identification is decreased, resulting in low recognition rate. On the other hand, when the camera 4 is provided on the grip support 24 as in this embodiment, the finger vein pattern of the backside of the hand is imaged. When the user grasps the doorknob 22, the wrinkle of the finger's backside skin is extended forcing the vessels to relatively appear near the surface. In addition, because the vessels are not putted under stress at the gripping time, the vein pattern can be clearly imaged and thus the personal identification can be implemented with high recognition rate.

When the user does not grasp the doorknob 22, but just extends the fingers, the finger's backside skin remains thick. Therefore, even if the camera receives the transmitted light from the light source 3, the penetration rate is reduced because of the flap of the skin, and thus the finger vein pattern of the backside of the hand is reflected dark as a whole. This fact results in the reduction of the accuracy with which the vessel pattern is extracted. Therefore, it is desired to pick up the image with the timing that the user has fully grasped the grip 22. In addition, it is necessary that the grip 22 have enough thickness and curvature for the fingers to bend to a certain extent when it is fully grasped. Moreover, if the grip 22 is shaped to easily grasp, the operationality can be enhanced.

Figure 3A:
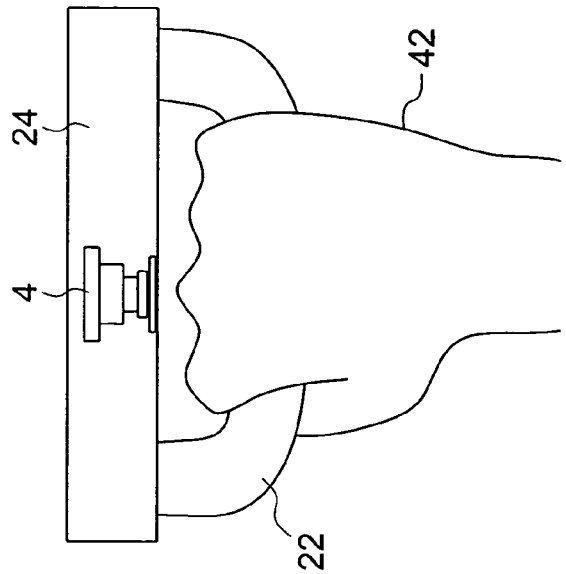
FIGS. 3A-3D are diagrams showing an example of using the grip-type finger-vein identification device.
Figure 3B:
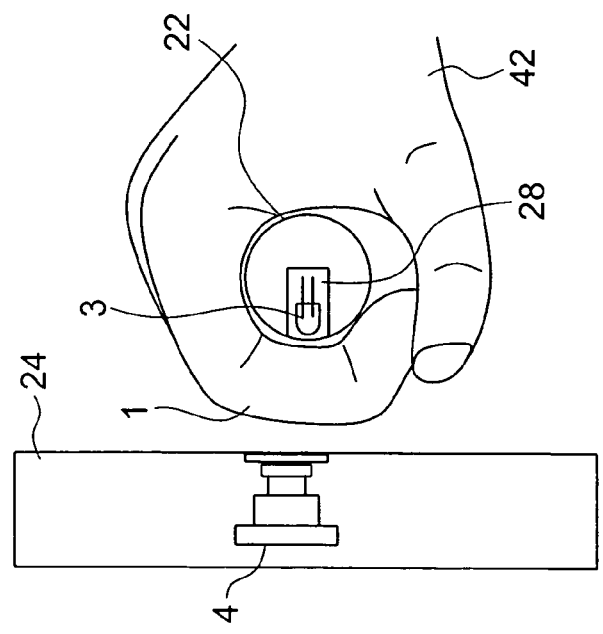
Figure 3C:
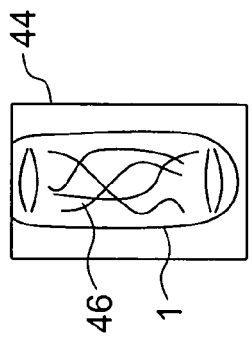

FIGS. 3A through 3D show the conditions in which the user has fully grasped the grip of the identification device illustrated in FIG. 2. FIG. 3A shows a side view of the device, FIG. 3B shows a top view of the device, and FIG. 3C is a diagram viewing from the camera 4 toward the light source 3. An example of the procedure for the identification process will be explained with reference to the flowchart of FIG. 22. First, the component devices such as memory and light source are initialized (S422). Then, judgment is made of whether the grip 22 has been fully grasped (S424). This condition can be sensed by faintly exciting the light source, monitoring this image on the camera 4 at all times, and then detecting that the image is blocked. Alternatively, a switch for detecting the grasping operation may be separately provided. The former method can reduce the number of components, while the latter method can suppress the consumption power.

Figure 3D:
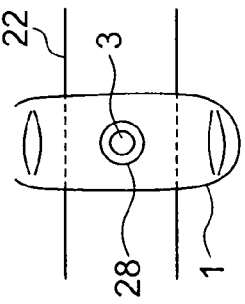

When the finger 1 is detected, the amount of light from the light source is adjusted to make the image clearest (S426). Then, the vein image of the hand's backside is acquired (S428). FIG. 3D shows an infrared image 44 of the finger 1 thus obtained. The infrared light is irradiated on the finger 1 from the palm side, and passed through the finger 1. The light exits from the finger surface of the hand's backside and arrives at the camera 4. At this time, since the veins of finger 1 lying under the skin of the hand's backside block the infrared light, the vein pattern 46 clearly appears. The finger vein pattern of the hand's backside can be divided into a region from the fingertip to the top joint, a region from the top joint to the second join, and a region from the second joint to the third joint. In this embodiment, the regions to be picked up are changed according to the angle at which the user grasps the grip. Particularly the finger veins of the hand's backside between the first joint and second joint of the finger are most suited to pick up for identifying individuals because they have complicated vessel patterns and relatively less hair. Thus, it is desired to mount the camera 4 so that when the user naturally grasps the grip 22, that region can be chiefly imaged.

Then, the contour of the finger is detected (S430). The possible methods for detecting the contour are a method for emphasizing the edge of the image, and another method for tracking the edge area.

The contour detection is followed by the correction for the parallel direction or for the orientation of the rotational direction in a plane (S432). As an example of the correction method, the sense, or angle of the finger's longitudinal direction is estimated from the contour information, and the image is rotated so that this angle can be made constant. Then, the vessel pattern is extracted (S434). To extract the vein pattern, various methods can be employed. There are a method to use an edge emphasizing filter or matched filter for emphasizing the line segments, a method to extract line patters by tracking the line components, and a method to extract the positions of local depressions of brightness in the cross-sectional profile of the image.

Then, characterizing portions, or features are extracted from the extracted or emphasized vessel pattern (S436). To extract the features, it can be considered to use a method to employ the image itself as the features or a method to detect branch points and endpoints.

Finally, the inputted feature data is compared with the feature data registered in the device (S438). When the image itself is used as the features, the images themselves are overlapped on each other, and the pixels are compared with each other so that the coincidence rate can be computed. When the branches and endpoints are used as features, information of their locations and numbers and the angles and relative distances of branch lines are compared so that the coincidence rate can be computed. The coincidence rate thus obtained is used to judge whether the measured image is the same pattern or another different pattern (S440). The threshold Th can be previously calculated in a statistical manner. If the computed coincidence rate is higher than this threshold, the finger image is judged to be of the registrant (S442). If it is lower than the threshold, it is judged that the finger image is not registered, and the authentication is rejected (S444).

Figure 4:
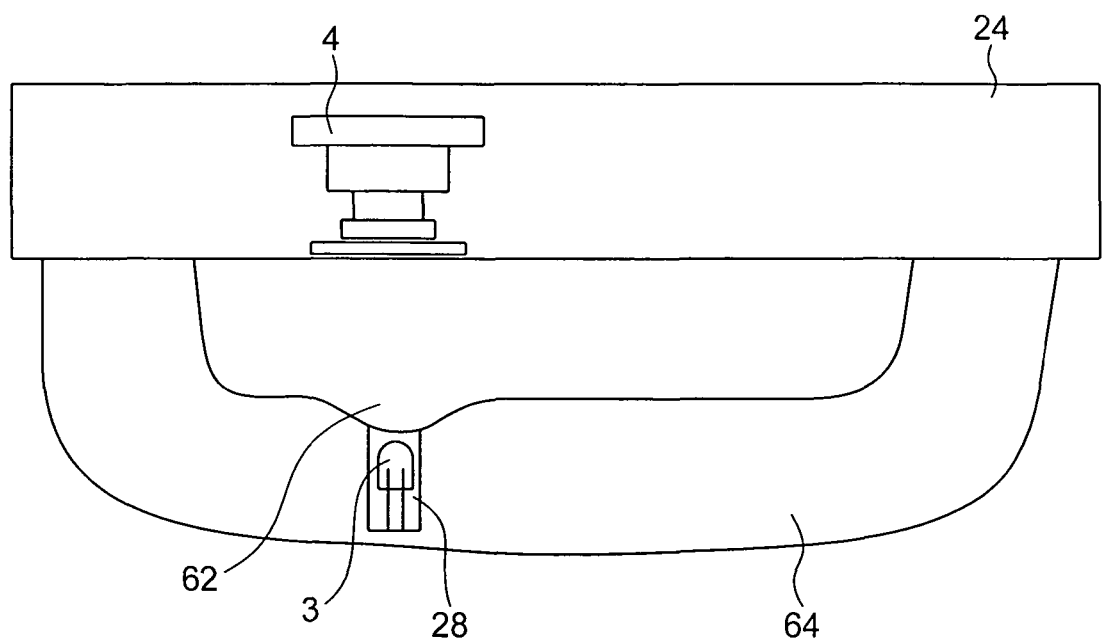
FIG. 4 is a diagram showing an example of the construction of another grip-type finger-vein identification device having a groove for alignment of a finger.

FIG. 4 shows an example of the construction of another grip type finger vein-identification device. The grip 64 has a groove or recess 62 for finger alignment. The light source 3 is embedded in the grip 64 at the position corresponding to the central position of the groove 62. The camera 4 is mounted so that it can pick up the area around the groove 62. This construction supposes that the user will place the finger to be identified in the groove 62 when the user grasps the grip 64. Particularly in the construction shown in FIG. 4, the groove 62 is provided deviated to the left from the center of the grip 64 so that when the user naturally grasps the grip 64 by the right hand, the forefinger fits in the groove 62. Thus, this position is suited for the camera to pick up the finger vessel pattern of the hand's backside. This groove 62 has the effect to suppress the finger from shifting in the lateral direction. Thus, each time the user grips the handle, the finger can be stably set in proper position. Therefore, the identifying accuracy can be increased. In addition, since the user can easily set his or her fingers on the grip 64, the operationality can be improved. Moreover, since the light source 3 is mounted at the central position of the groove 62, it can be completely covered by the finger if the finger is pressed against the groove 62 to fit therein when the user stretches the finger forth. Therefore, the emitted light can all penetrate the finger. Thus, the light irradiation efficiency is increased, and the leakage of light that reduces the contrast of the penetration image can be restrained to be small.

FIGS. 5A and 5B are diagrams showing an example of the construction of another grip type finger vein identification device. As illustrated in FIG. 5A, this embodiment has a plurality of grooves 62 provided on a grip 82, or in this case, grooves for four fingers. In addition, the light sources 3 are provided at those grooves 62, respectively. In this embodiment, the camera 4 is provided to locate so that it can pick up all the grooves at a time. However, if all the grooves cannot be picked up because of field angle, it is possible to provide a plurality of cameras.

If much vessel pattern information is acquired at a time by this structure, the recognition rate can be improved. However, there is no need to use all the fingers fitted in the grooves for the identification of individuals. It is possible to register the fingers and finger number to be used for each user. In addition, even when a finger is injured, the image of this finger may be removed from the images of all the plurality of fingers picked up so that the rest of the images can be used for the identification. Although the structure having the single groove 62 might be inconvenient because the user feels difficult to grasp by the left or right hand, putting out fingers to fit in a plurality of grooves will make it possible to similarly identify individuals by either one of both hands. Thus, it is possible to provide an interface that does not depend on dominant hand.

FIG. 5B shows an example of the finger vein image obtained when the user grasps the grip in order for the four fingers to fit in the grooves. The light sources 3 for irradiating on the fingers are independently controlled so that the optimum amounts of light can be irradiated according to the thickness of the fingers. The contour and feature of each finger 1 are independently extracted. When all the patterns of the presented fingers 1 are coincident with those registered, the user is considered as the registered person, thus the identifying process being completed. At this time, the user can be identified even when one finger, two fingers or three fingers of the four fingers coincide with those registered. Thus, the erroneous recognition rate of the rejection of identical person and acceptance of other person can be regulated, and the identification device can be operated according to the security level of the installation location.

While this embodiment has four grooves 62, more vessel pattern information can be obtained than the structure shown in FIG. 4 if the structure has a plurality of, or two or more grooves 62.

FIGS. 6A and 6B are diagrams showing an example of the construction of another grip type finger vein identification device. In this embodiment, a bar 102 for finger alignment is provided to divide the space in which the fingers are inserted into two regions as illustrated in FIG. 6A. FIG. 6B shows the situation in which the user actually grasps the grip 104. The forefinger of the right hand is inserted in the left space partitioned by the bar 102 for finger alignment so that this bar 102 can be held between the forefinger and the middle finger. At this time, this bar 102 fixes the hand not to move in the lateral direction. In addition, when the user deeply grasps the grip 104 until the bar 102 for finger alignment can be made in contact with the roots of the forefinger and middle finger, the hand can be fixed not to move in the rotational direction in which the hand grasps the grip 104 in the round. Thus, the user can tactilely comprehend the grasping position so that the identification can be stably performed.

In this embodiment, the bar 102 for alignment of finger is provided to the left of the center of the grip, and the light source and camera 4 are also provided to the left side. In this case, although this structure takes an optical system suited to pick up the forefinger of the right hand, the bar 102 for finger alignment may be provided at around the center of the grip. In this case, since the user can grasp the grip so that the bar 102 for alignment of finger can be held between arbitrary ones of the fingers, the convenience can be improved. In addition, it is possible to provide a plurality of the light sources 3 and a plurality of cameras 4. In this case, since the number of patterns obtained can be increased, the identification accuracy can be improved.

FIGS. 7A and 7B are diagrams showing an example of the construction of another grip type finger vein identification device having a plurality of light sources provided in the longitudinal direction of the fingers. FIG. 7A shows a cross-section of the grip, and FIG. 7B shows a picture viewing from the camera 4 to the light source 3. Since a grip 122 has a plurality of light sources provided in the longitudinal direction of the fingers, the finger 1 can be illuminated all over. Thus, it is possible to clearly pick up the finger vein patterns of the hand's backside that are distributed all over the finger. At this time, if the hole 28 for the light sources 3 is wider than the width of the finger 1, part of the light rays from the light sources is leaked, thus saturating around the contour of the finger or it is reflected from the surface of the finger of the hand's backside that is wanted to pick up, thus reducing the contrast of the image. Therefore, in order to pick up a clear image, it is desired that the hole 28 for the light sources be disposed to be narrower than the width of the finger 1.

Figure 8:
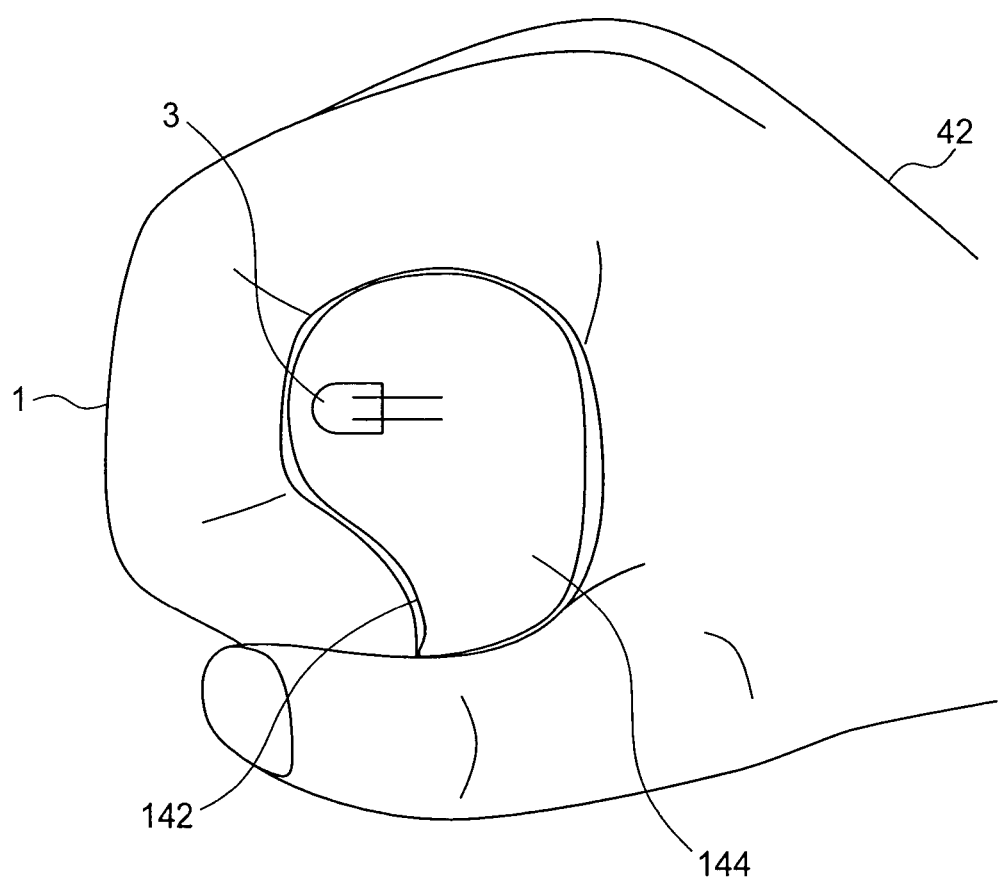
FIG. 8 is a diagram showing an example of the construction of another grip-type finger-vein identification device having a recess for alignment of fingertips.

FIG. 8 is a diagram showing an example of the construction of another grip type finger vein identification device having a recess for finger alignment. If the cross section of the grip is simply circular, the depth to which the fingers grasp the grip is changed, thus acting to deviate the region being picked up in the rotational direction around the center axis of the grip. Therefore, since the registered pattern and the picked up pattern become different from each other, the recognition rate is reduced. Thus, in order to prevent the hand from deviating in the rotation direction when the user fully grasps the grip, a recess 142 for alignment of finger is provided on a grip 144. The recess 142 is shaped to have a gentle curve so that when the user grasps the grip, the fingertip can be naturally slipped into the recess until the finger tip reaches the center of the recess, and to have a steep curve so that the fingertip hits the wall of the recess to stop when the fingertip goes on ahead away from the center of the recess. In other words, the distances of a portion of the surface of the grip from the center axis of the grip in the direction perpendicular to the surface are extended to be longer than those of the other portions. Thus, since the curvature radius of the grip is partially changed, the user can perceive the depth to which the fingers are inserted. Since the user grasps the grip so that the fingers are fitted in the recess, the hand is never shifted in its position in the rotational direction and thus stable authentication can be implemented. The depth of the recess 142 is desired to be somewhat smaller than the thickness of the fingers so that the nails cannot hit the wall of the recess. Thus, since the nails are not impinged on the wall surface that forms the recess 142, the gripping is not easily affected by the change of the lengths of the nails. In addition, the recess is desirably provided as such a location that the camera can pick up the region between the first and second joints of the finger where there are complicated vessel patterns that have a large amount of information. In addition, in place of the recess, a projection may be provided that is somewhat lower than the thickness of the fingers. In this case, when the user grasps the grip to the extent that the fingertip can be hit on the projection, the hand can be fixed not to move in the rotational direction.

Figure 9:
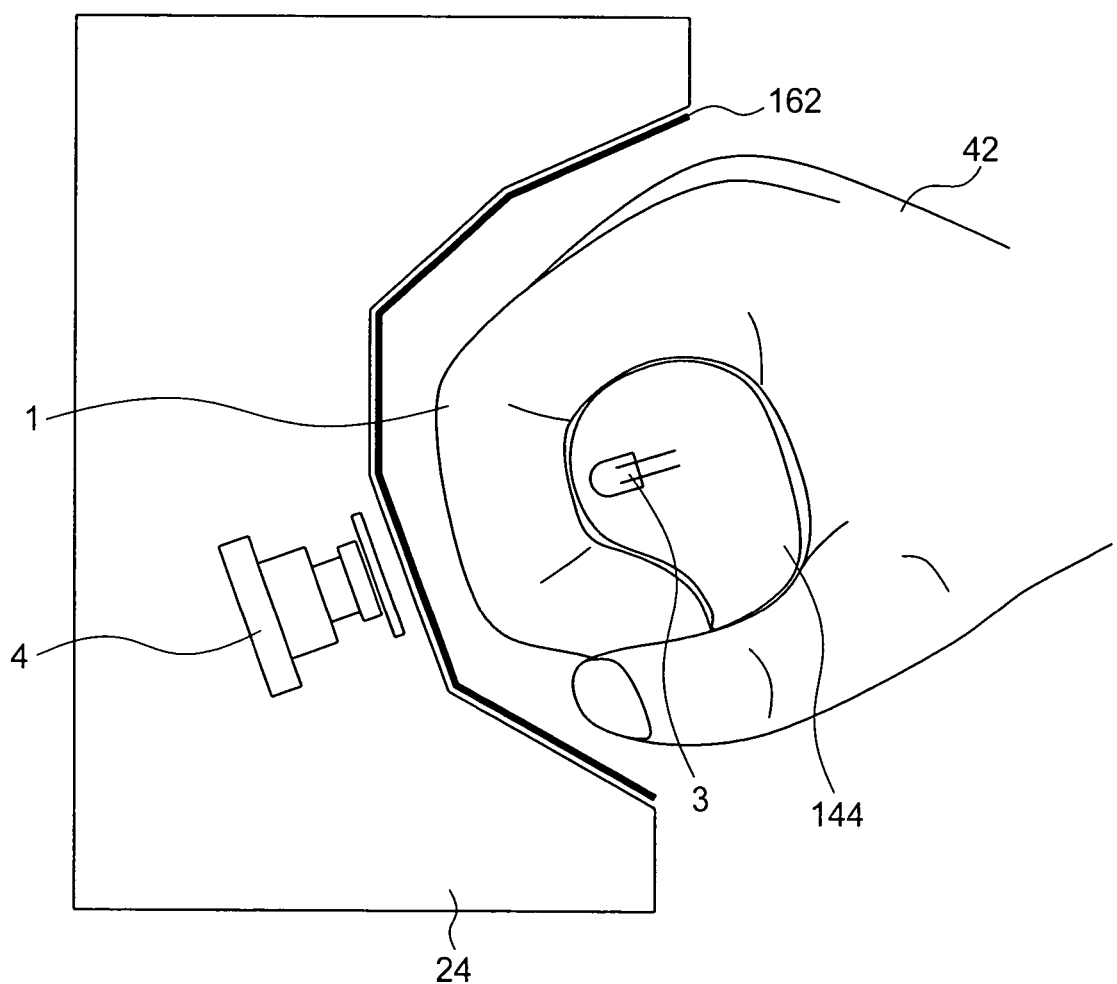
FIG. 9 is a diagram showing an example of the construction of another grip-type finger-vein identification device having a camera provided below the grip.

FIG. 9 is a diagram showing an example of another grip type finger vein identification device that has the camera provided on a lower side than the grip. When this device is used in the open air, the external light such as sunlight might be incident to the camera, thus greatly affecting the authentication accuracy. Therefore, the camera 4 is used as in a light-shielded condition as possible. If the device is constructed as shown in FIG. 3A, external light might enter into the space between the grip 22 and the grip support 24 where the hand 42 is inserted. Thus, in this embodiment, the camera 4 can be covered by the grip 144 or by the hand 42 that grasps the grip 144. The camera 4 is mounted below the center axis of the grip 144, and the grip 144 is tilted so that its center direction, or the light emitting direction can be directed to the camera. When the hand 42 is inserted under this condition, the external light can be completely blocked from entering from above in an oblique direction and reaching the camera. Therefore, this device can attenuate the effect of the external light that enters from above in an oblique direction. However, although there are still light paths through which the external light repeats the reflection from the walls of the inside of the device and finally reaches the camera 4, the effect of the paths can be suppressed by attaching an infrared light reflection preventing material 162 on the inside wall surfaces.

The direct external light can also be prevented if the light source is mounted above the center axis of the grip so as to direct downward. In this case, however, it is necessary to consider that the light reflected from the backside of the hand might be incident to the camera.

FIGS. 10A and 10B are diagrams showing an example of another grip type finger vein identification device that starts the authentication when the user pulls the grip toward the user's side. As illustrated in FIG. 10A, grip connectors 182 are provided at the joints between the grip 22 and the grip support 24. Conductors 184 are mounted on the tops of the connectors 182, and elastic members 186 such as springs are mounted around the connectors 182. In addition, contacts 188 serving as electric switches are provided near the connectors 182. The identification device is normally in the sleeping condition in which the light from the light source 3 is completely extinguished so that the camera does not make its imaging operation. As illustrated in FIG. 10B, when the user grasps the grip 22 and pulls the grip 22 toward his or her side to start opening the door, the conductors 184 are connected to the contacts 188, thus constituting electric circuits. The authentication processor 10 detects this timing, causing the light source 3 to turn on in order to acquire the image for the extraction of vessel patterns, and at the same time the camera 4 to pick up the image. When the user releases his or her hand away from the grip 22, the force of the elastic member 186 causes conductors 184 and the contacts 188 to separate away from each other to thereby open the circuits, and thus the identification device is again brought to the sleeping mode.

Thus, since the authentication process is executed in conjunction with the operation that the user makes to open the door, it is possible to regulate the exciting time of the light source 3 and the time in which the finger detection process and image process are performed. Therefore, the amount of power consumption can be reduced. In addition, since the finger 1 is supposed to be located at a predetermined position at the instant when the user pulls the grip 22, stable authentication can be implemented. Moreover, as described above, when the user pulls the grip, it is sure that the user grasps the grip by the hand. Thus, since the wrinkled skin of the fingers of the hand's backside is tensioned, it is expected to provide a good condition for the detection of veins.

In place of the switches constituted by the conductors 184 and contacts 188, the grip 22 itself may have a push button switch or a pressure sensor provided to detect the door pulling force or grip strength. In addition, similarly a thumb latch type grip or knob type grip may be used so that the authentication processor 10 can detect the depression of the thumb latch by thumb or the twist of knob, thus starting to identify at this timing.

FIG. 11 is a diagram showing an example of the construction of another grip type finger vein identification device provided at the doorknob of an automobile. When the user grasps the grip 22 mounted on the door 204 of the car, the authentication process is executed, causing the door 204 of the car to be unlocked if the picked-up finger vein pattern coincides with that registered in the authentication system. At this time, to support the door 204 to open, the door's latch may be automatically released or the door 204 may be automatically opened in conjunction with the power door. Therefore, even the door such as slide door that needs a comparative force to open can be opened without less force. Moreover, it can be considered for each registrant to preset information of fixtures that need adjustment depending on drivers such as position and angle of seat 206, room mirror 208 and side mirror 210. Then, when the authentication by the doorknob has been completed, the settings such as the position and backrest angle of seat 206 and the angles of room mirror 208 and side mirror 210 can be read out to automatically adjust the fixtures. The other customizing items will be settings of car navigation system, temperature of air conditioner, settings of car audio and so on. As compared with the case when the driver sits in the seat and then sets those fixtures, the user can save the trouble of manually setting and greatly reduce the time necessary for the adjustment, thus convenience being improved.

Figure 12:
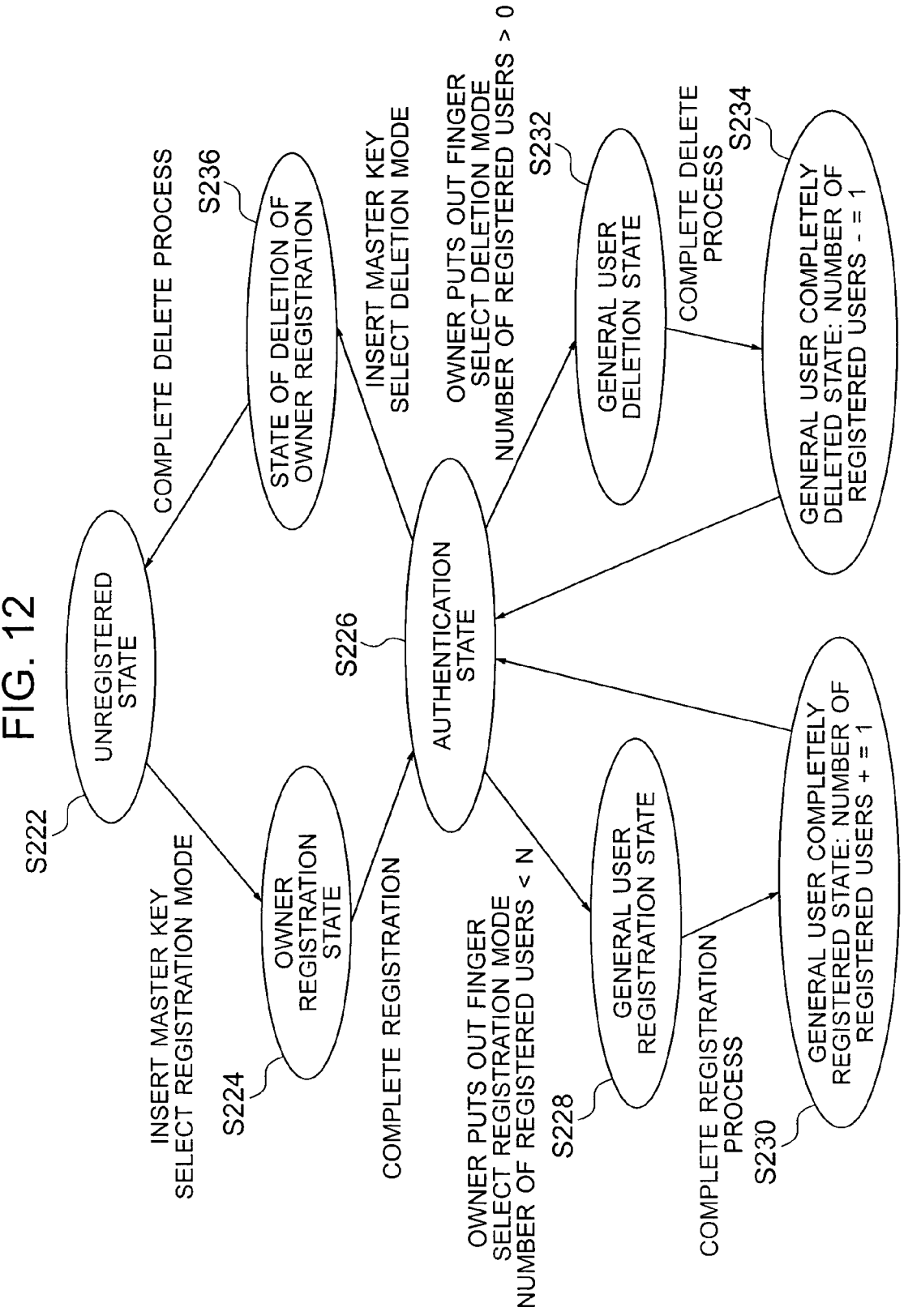
FIG. 12 is a flowchart showing an example of the flow of the registration processes in the finger-vein identification device provided on the automobile.

FIG. 12 is a flowchart of the registration in the grip type finger vein-identification device installed in a car.

When the car is purchased, the initial state is an unregistered state (S222). The authentication system has no registered data of finger vein pattern. When the data is initially registered, it is necessary to use the belonging of only the car's owner such as master key. Thus, it can be prevented that any person registers the data. The master key may be used only when it can be confirmed that the master key is not a fake key by using for example such validation means for genuineness of device as in the immobilizer security system. When the user inserts the master key in the key cylinder within the car, and turns on the registration switch installed at an arbitrary place within the car, the owner registration state (S224) is brought about. In this mode, the user can register the finger vein of the car's owner. If the user does not have the master key, the user cannot register the owner's information and change or delete data. The registration can be completed when the user actually grasps the doorknob of the car a few times so that the vessel patterns of his or her finger can be imaged as at the authentication time mentioned above. At this time, the input/output interface of the car navigation system or the display within the car may be used to display the registration operations and registered situations. When the owner's registration is completed, the registrant makes the authentication process and then the transition to the state (S226) in which the user can unlock the door.

When the user who drives a car is limited to the owner, the user can drive after only the above registration operations. When the same car is used by a plurality of persons, however, those persons can additionally register as general users. When one of the persons additionally registers, the finger vein authentication process of, for example, the owner is performed. Then, if the authentication process judges OK, the registration switch is turned on, thus making it possible to switch to the general user's registration state (S228). Thus, another driver can additionally register under the approval of the owner. However, in order to limit the memory capacity of the system and prevent the recognition rate from being reduced, it is necessary to previously determine the maximum number of possible general user registrants. When the registration for the general user has been completed, the general user completely registered state (S230) is brought about. At this time, the counter for registrant number is incremented by 1, and the process automatically goes back to the authentication process mode. When deleting the registration of general users, the user executes the process of the personal identification using the owner's finger vein, and turns on the registration delete switch that is provided at an arbitrary place within the car. This operation brings about the general user deletion state (S232). In order to select one of the general users of which the registration data is to be deleted, the operator may use the input/output interface of the car navigation system or the like or may depress the switch of user numbers that is provided at an arbitrary place within the car. This operation causes the process to shift to the general user completely deleted state (S234) in which the counter for registrant number is decremented by 1, and the authentication process mode is automatically brought about.

In addition, when the registration of the owner is deleted, the master key is used and the registration delete switch is turned on. This operation causes the deletion of the owner registration (S236) to bring about. In this mode, the registered data of the owner is deleted, and then the process goes back to the unregistered state. However, when this deletion of owner registration is brought about, it is possible to perform the personal identification of the owner, and bring about the delete mode only when the authentication is OK. Therefore, the registration can be deleted only in the presence of the owner, and thus it is possible to prevent other evil, unrelated persons from deleting the registration.

After the completion of the above user registration, it is sure that the normal authentication mode is automatically brought about. Thus, the user can be prevented from forgetting to switch from the registration mode to the authentication process mode. Thus, it is possible to prevent evil unrelated persons from registering data. In addition, in the registration mode, the car cannot be started. Therefore, it is possible to protect the car from being robbed during the registration operation.

The customized registration of the fixtures within the car may be performed at the same time that the finger vein pattern data is registered. The customizing items include seat position, mirror angle, settings of car navigation system, temperature of air conditioner, settings of car audio and so on as described above. These fixtures can be set according to the individual's preference.

The engine of car may be started by depressing the engine start button installed within the car in addition to the use of the conventional key. In this case, something to take along such as a key is not necessary, thus convenience being improved. In order for higher-order security to be maintained, the engine start button may have a body authentication function such as finger vein authentication provided. In this case, when the engine start button is depressed, the registrant can make the body authentication, but other persons than the registrant cannot start the engine. In addition, it is possible to start the engine only when the registrant who opened the door coincides with the registrant who depressed the engine start button. Moreover, if the engine start button has no body authentication function, the engine start button may be disabled when the door of the car keeps opened for a certain time. Thus, it becomes useful for anticrime measures, even if the user, after opening the door, leaves the car with the door kept open.

Figure 13B:
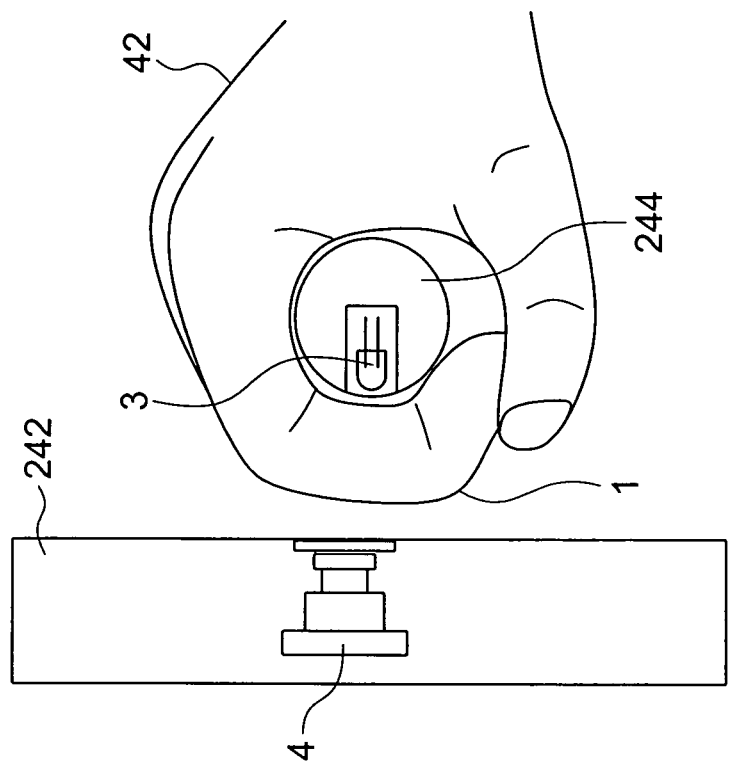
FIGS. 13A and 13B are diagrams showing an example of the construction of another grip-type finger-vein identification device that is provided on a lever-handle type door.
Figure 13A:
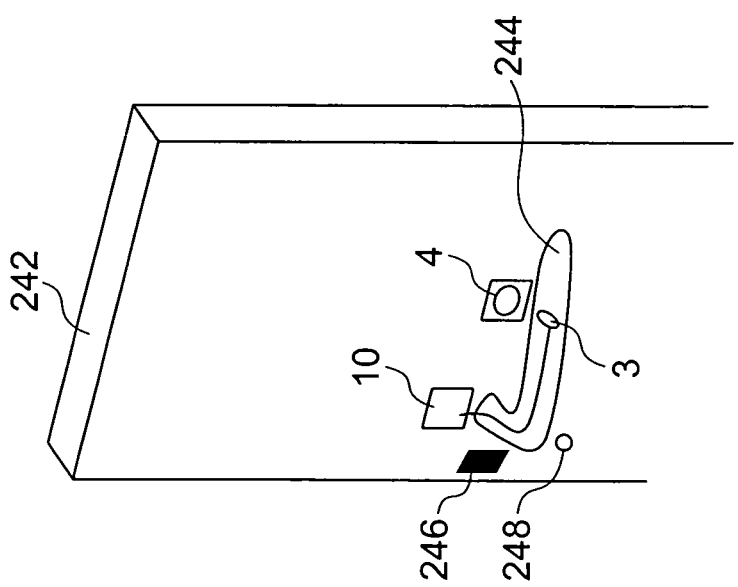

FIGS. 13A and 13B are diagrams showing an example of the construction of another grip type finger vein identification device capable of personal identification by grasping a lever handle type doorknob. As illustrate in FIG. 13A, the light source 3 is incorporated within a layer handle 244 mounted on a door 242, and the door 242 has the camera 4 provided therein to oppose the light source 3. As illustrated in FIG. 13B, when the user grasps the lever handle 244, the light source 3 irradiates light on the finger of the user, so that it is started to pick up the finger vein pattern and make the authentication process. The registered finger vein pattern is compared with the picked up finger vein pattern. If the user is identified as the registrant, an electric lock 246 mounted in the door 242 is unlocked. The registration of data for the authentication can be performed by, for example, grasping the lever handle 244 under the condition that a key separately prepared for registration is inserted in a keyhole 248 provided in the door 242. Alternatively, an input interface such as a ten keypad may be mounted on the door 242 so that a password can be entered through the input interface to bring about the registration mode.

The light emission and the imaging may be started on the basis of whether a switch detects that the user has grasped the grip as described above or by detecting that the user has tilted the lever handle 244. In the case where the authentication is started when the lever handle 244 is tilted, it is supposed that the handle 244 is already somewhat tilted at the actual image picking-up time. Therefore, if the camera 4 is mounted at a location deviated according to the tilt angle of the lever handle 244, it is possible to more accurately pick up the finger.

Figure 14:
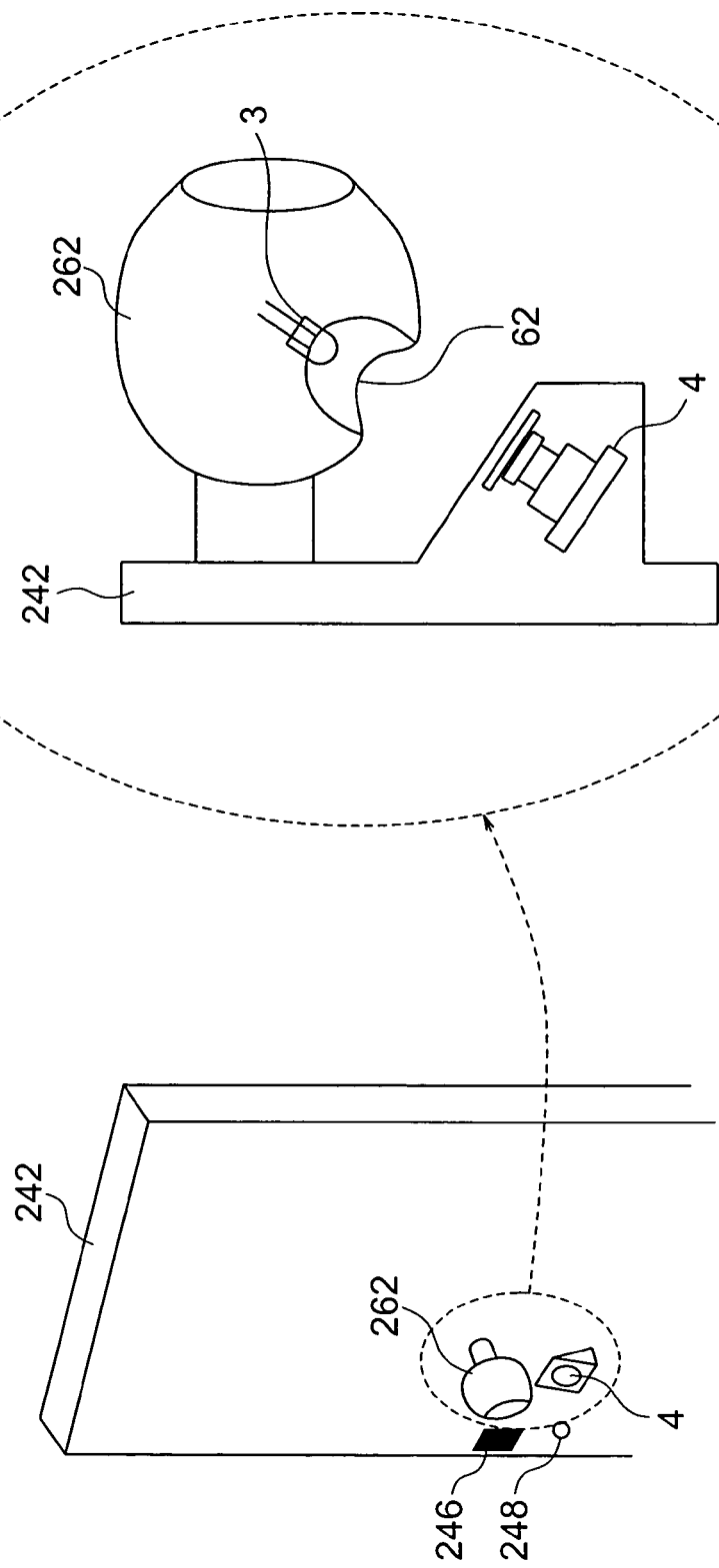
FIG. 14 is a diagram showing an example of the construction of another grip-type finger-vein identification device that is provided on a knob grip type door.

FIG. 14 is a diagram showing an example of the construction of another grip type finger vein identification device having the light source embedded in a knob type doorknob. A knob 262 (spherical knob) has the groove 62 for finger alignment formed therein and the light source 3 provided within the knob at around the position of the groove. The camera 4 is mounted in the door at a location to oppose the groove 62 of the knob 262. When the user grasps the knob 262, putting out the finger to the groove 62, the camera 4 picks up the finger vein pattern of the hand's backside, thus starting the authentication. In this embodiment, the light emission and authentication are started when the rotation of knob 262 is detected or when the knob 262 is pulled or pushed without rotation. Thus, the power consumption can be reduced.

Figure 15B:
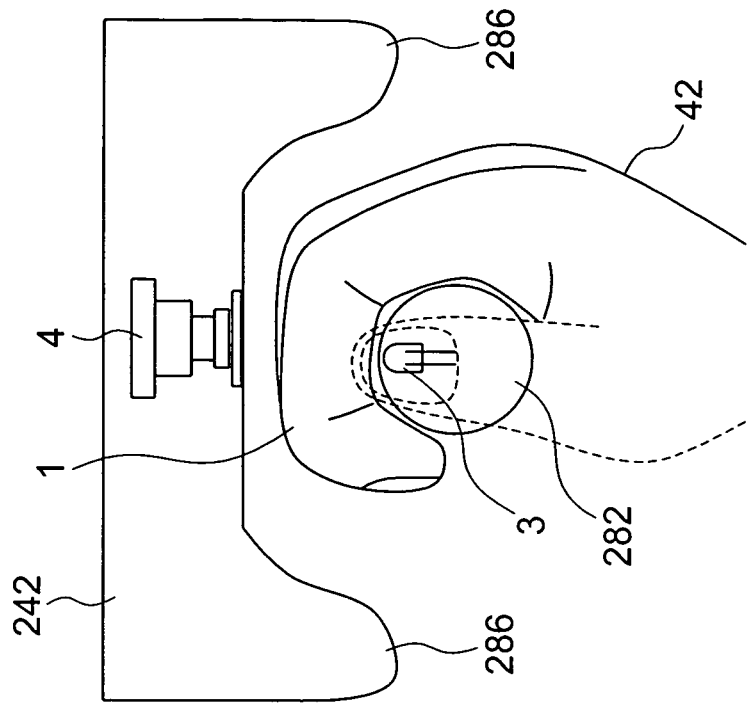
FIGS. 15A and 15B are diagrams showing an example of the construction of another grip-type finger-vein identification device that is provided on a thumb latch grip type door.
Figure 15A:
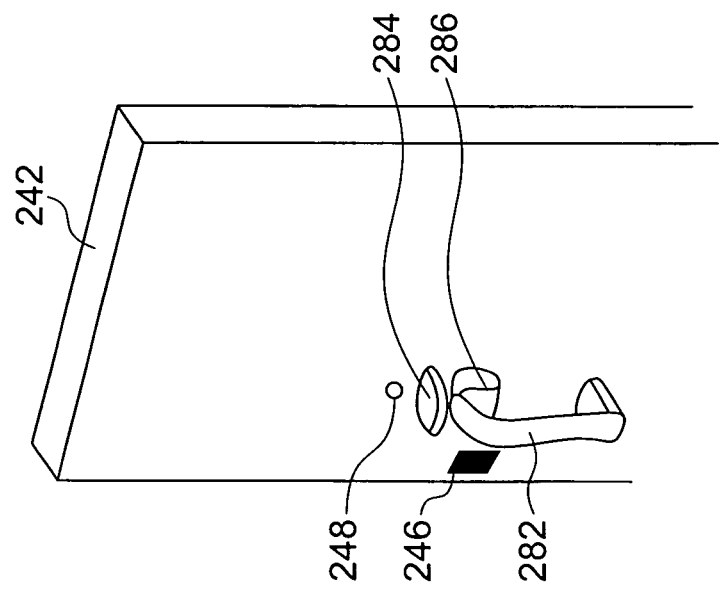

FIGS. 15A and 15B are diagrams showing an example of the construction of another grip type finger vein identification device having the light source 3 incorporated in a thumb latch type doorknob. As illustrated in FIG. 15A, a thumb latch lever 284 is located above a thumb latch handle 282. In addition, as illustrated in FIG. 15B, the light source 3 is provided within the thumb latch handle 282. In the embodiments shown in FIG. 14 and FIGS. 15A and 15B, the registration process and unlocking process can be made as disclosed in FIGS. 13A and 13B. In addition, in terms of structure, the thumb latch handle 282 may have provided therein the groove or bar for finger alignment shown in FIGS. 4 and 6B. Thus, since the finger can be stabilized, the recognition rate can be improved.

Moreover, in this embodiment, the external light might be entered through the gaps on the sides of the thumb latch handle 282. In order to prevent the picture quality from being deteriorated due to this external light, a light-shielding hood 286 may be further added. This hood is made of a material not to allow infrared light to pass or reflect, and thus it can block the external light from the outside and stop the reflection of the inside infrared light. Therefore, the performance can be prevented from being deteriorated by the external light from the sides.

The light emission and authentication in this embodiment can be started to make as mentioned above when a sensor, switch or the like used detects that the user's thumb has depressed the thumb latch lever 284 or when the user has grasped the thumb latch handle 282. Therefore, the power consumption can be reduced.

Figure 16:
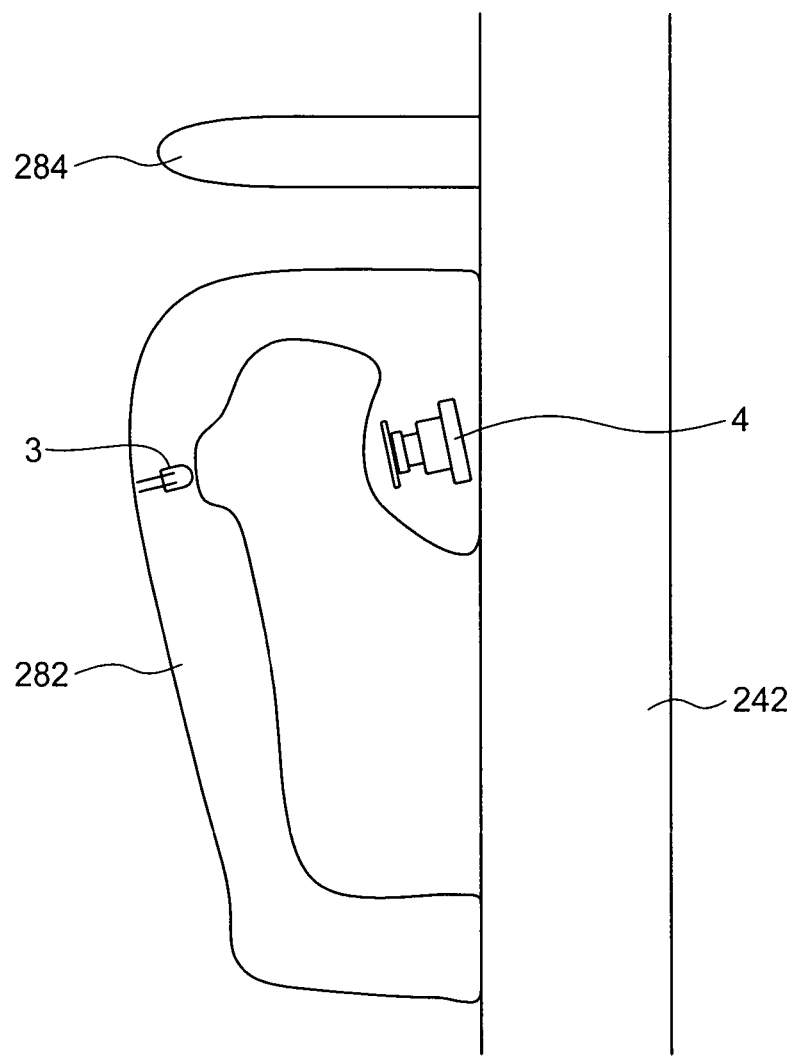
FIG. 16 is a diagram showing an example of the construction of another grip-type finger-vein identification device having the grip and camera combined to be built in a single piece.

FIG. 16 is a diagram showing an example of the construction of another grip type finger vein identification device using a thumb latch type doorknob that has both camera and light source incorporated. In this embodiment, since the light source 3 and camera 4 are already incorporated in the members that constitute the thumb latch handle 282, the handle can be just mounted as one module on the door. In the example shown in, for example, FIG. 13, it is necessary to provide the camera 4 independently of the grip 22, and at this time the alignment is needed. Thus, according to the structure shown in FIG. 16, the device can be easily mounted, so that the installation cost can be reduced. This structure can be similarly applied to the lever handle and knob type handle as well as the thumb latch type doorknob.

Figure 17B:
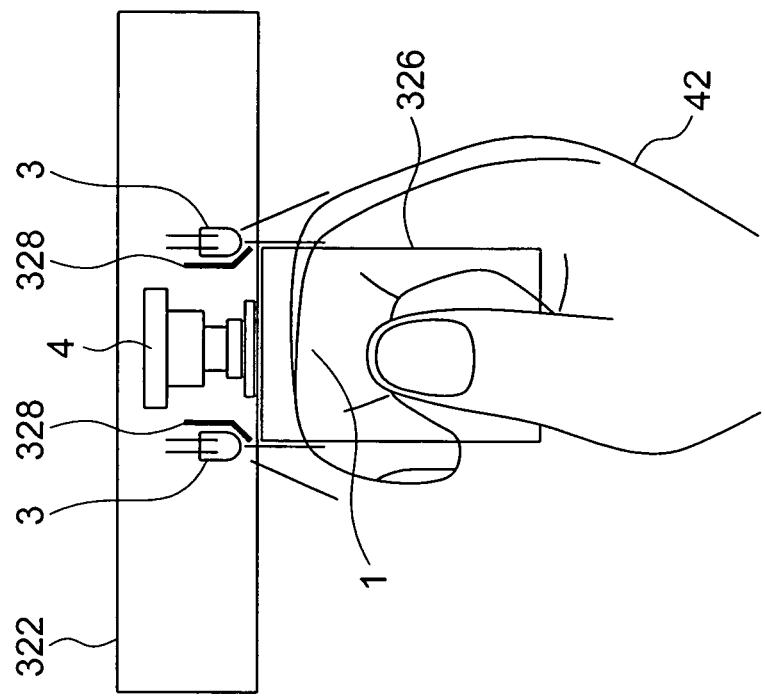
FIGS. 17A and 17B are diagrams showing an example of the construction of a finger-vein identification device that picks up the finger veins of the hand's backside when a card is inserted.
Figure 17A:
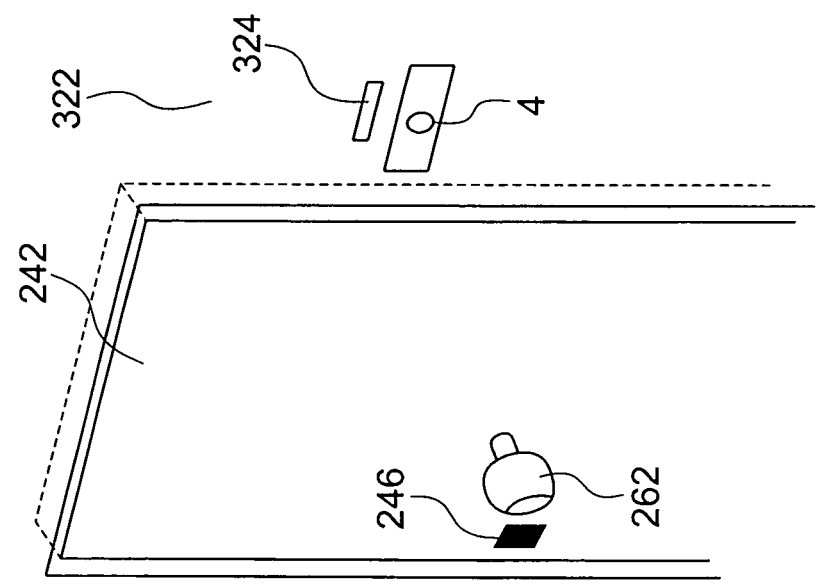

FIGS. 17A and 17B are diagrams showing an example of the construction of an identification device that picks up the finger vein pattern of the hand's backside when a card is inserted. As illustrated in FIG. 17A, an identification device is provided on a wall surface 322 with the door 242 mounted. A card insertion slot 324 is located above the camera 4. FIG. 17B shows the details of the identification device. The light sources 3 are mounted in the vicinity of the camera 4. When the light sources 3 irradiate light on the backside of the finger 1 holding a card 326, the camera 4 picks up the finger vein pattern of the hand's backside. However, when the infrared light from the light sources 3 were irradiated directly on the surface of the finger desired to pick up, the light reflected from the finger surface could reach the camera 4, and thus the camera 4 might pick up the skin of the finger not the inside vein of the finger. In order to prevent this, light-shielding plates 328 are provided between the camera 4 and the light sources 3. The light shielding plates 328 conduct most of the light from the camera 4 to the first and second joints of the finger not directly to the region to be picked up. The light to the joints is scattered within the finger and thus directed in various directions within the finger. At this time, the light that passes through the backside-skin of the finger and exiting to the outside is the penetrated light that passes through the region to be picked up. The camera 4 picks up this light, so that the finger vein pattern of the hand's backside can be acquired.

When the user holds the card 326 as illustrated in FIG. 17B and inserts it in the card insertion slot 324 without changing this state, the backsides of the fingers are naturally directed toward the wall surface 322. When it is detected that this card has fully inserted, the camera picks up the finger vein pattern of the hand's backside. Thus, the operation that the user makes to insert the card in the slot 324 causes the fingers to be positioned. The picked up image is compared with the previously registered finger vein pattern. If the user is identified as the corresponding registrant, the door 242 is unlocked.

In this embodiment, since the card itself is used as a take-along piece for personal identification, both this authentication of the card and the judgment using the finger vein can increase the security. In this case, in place of the card, a key may be demanded to insert in a keyhole. In this case, the same effect can be achieved. Moreover, the authentic finger vein pattern of the user may be stored within the card so that judgment is made of whether the finger vein pattern of the presented card coincides with the registered one. In addition, although the identification device is mounted on the wall surface 322 near the side of door 242 in this embodiment, it may be provided on the door 242 itself.

Figure 18A:
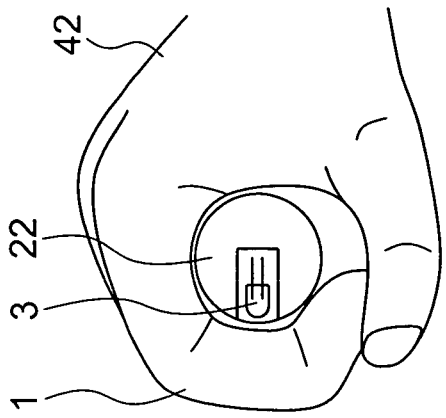
FIGS. 18A-18F are diagrams showing an example of the process that a grip-type finger-vein identification device makes when the user registers the images successively picked up in the course of gripping.
Figure 18B:
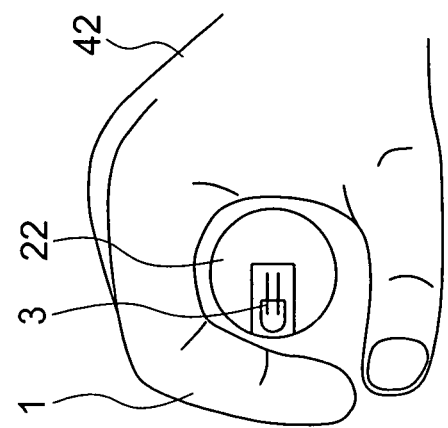
Figure 18C:
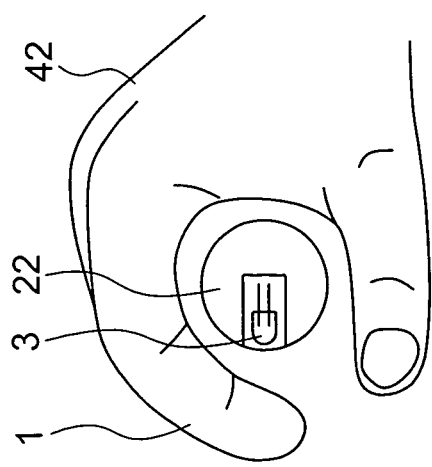
Figure 18D:
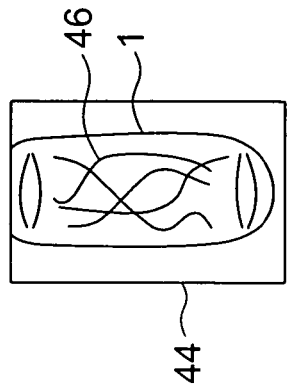
Figure 18E:
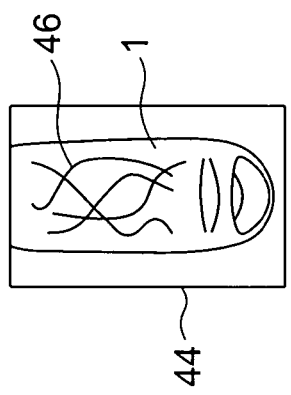
Figure 18F:
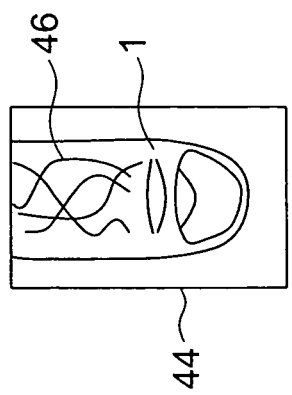

FIGS. 18A-18F are diagrams useful for explaining the grip type finger vein identification device for checking a plurality of finger vein patterns obtained in the process of the operations that the user makes from starting to grasping the grip to fully grasping the grip. As the user grasps the grip, the camera 4 picks up the fingertip, nail and top joint in turn, and it finally picks up the vessel patterns of the backside between the top joint and second joint. Thus, the fingers are put out in the rotational direction around the center axis of the grip and in time series manner. FIGS. 18A, 18B and 18C show the movement of the hand taken as the user grasps the grip. FIGS. 18D, 18E and 18F show time-series vein pattern images of the finger picked up as the user starts to grasp the grip and finally fully grasps the grip.

When the user initially grasps the grip, the fingertip position is not definite, and thus the gripping angle sometimes changes at each authentication time. Thus, when the vein patterns are registered, the infrared images 44 of the finger are picked up and stored in time series as the user makes the operations from starting to grasp the grip 22 to finally completely grasping the grip. Then, the amounts of features of the vessel patterns are extracted from each image, and all or part of those features are registered. When the user receives the authentication, the features are extracted from the sequence of images taken as the user makes operations from starting to grasp the grip 22 to finally completely grasping the grip, and those obtained features are compared with the plurality of registered ones. Even if the final gripping angle is different from the registered one, the features obtained during the process coincide with the registered one at a high rate. Therefore, when part of the registered plurality of pieces of data is coincident with one at the authentication time, the user is judged to be the authentic registrant as the final authentication result. Thus, highly reliable authentication can be achieved against the fluctuation of the gripping angle.

Figure 19:
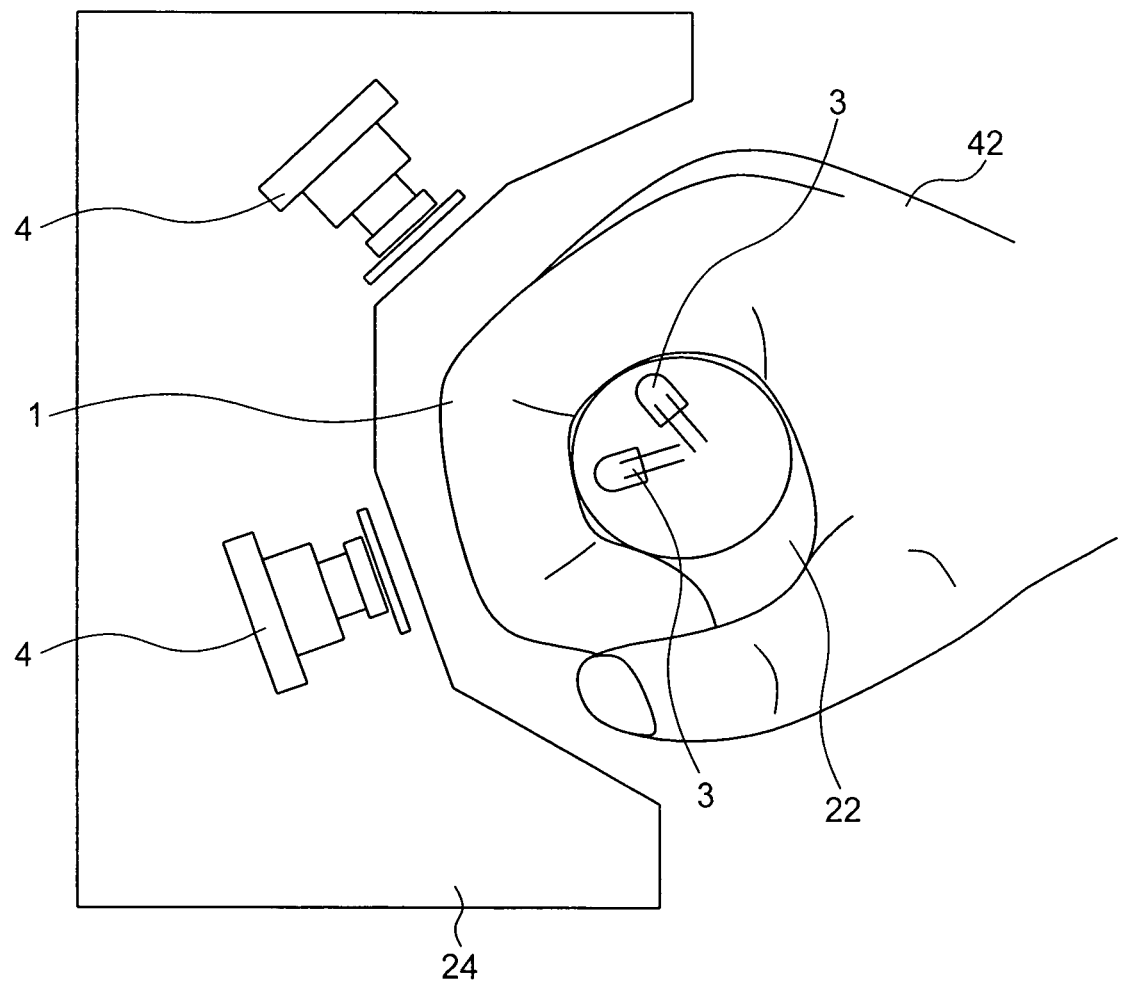
FIG. 19 is a diagram showing an example of the construction of another grip-type finger-vein identification device having a plurality of cameras.

FIG. 19 is a diagram showing an example of the construction of another grip type finger vein identification device having a plurality of cameras provided to circularly surround the center axis of the grip.

The grip support 24 has two cameras provided to circularly arrange around the center axis of the grip 22. In addition, a plurality of, or two light sources are mounted in the handle to oppose these cameras. At this time, the plurality of cameras 4 pick up the vein patterns of the user's finger 1 of the hand's backside. The upper camera 4 picks up the veins of the finger of the hand's backside between the second joint and root of the finger 1, while the lower camera 4 picks up the veins of the finger of the hand's backside between the top joint and second joint of the finger 1. Thus, as compared with the device having the single camera 4, the device having two cameras 4 can increase the amount of patterns to be picked up, and hence enhance the recognition rate.

At the authentication time, it is possible to compare the images obtained from the two cameras with the registered ones, respectively and evaluate each degree of coincidence. In addition, when the regions that the plurality of cameras pick up are partially overlapped on each other, it is possible to combine the acquired finger vein patterns into a pattern and keep it. The former method has the advantage that the algorithm of the conventional finger vein authentication can be used. In the latter method, even if the gripping angle fluctuates when the user's hand 42 fully grasps the grip 22, the angle fluctuation can be coped with by the positional correction using the parallel shift on the images, and thus robust checkup can be performed against the gripping angle fluctuation.

Figure 20:
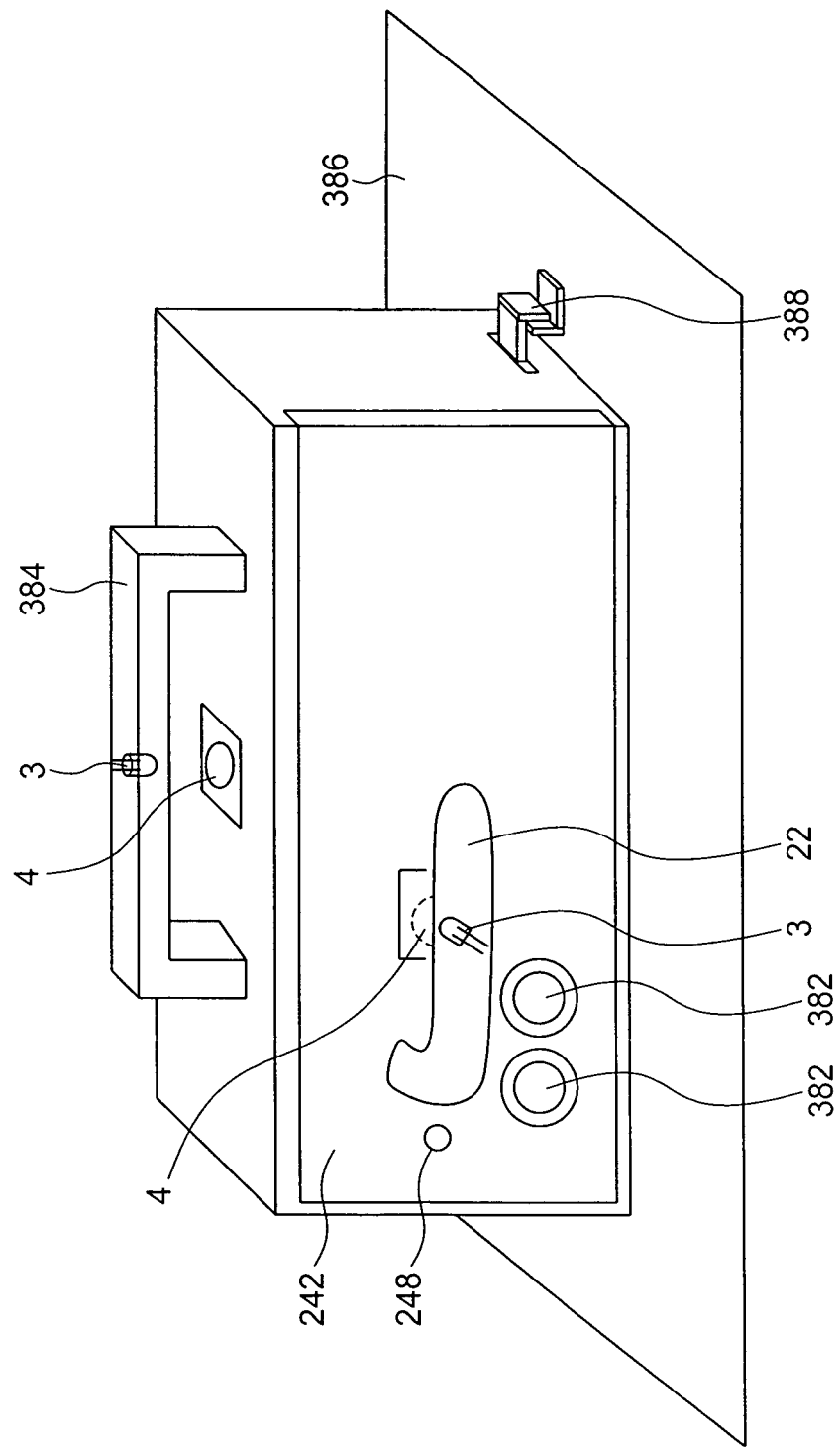
FIG. 20 is a diagram showing an example of the construction of another grip-type finger-vein identification device that is provided on a safe.

FIG. 20 is a diagram showing an example of a grip type finger vein-identification device built in a safe. The identification device is incorporated, as described above, in the grip 22 that is mounted on the door 242 of the safe. Thus, since any person other than the registrant cannot open the safe, the property can be defended. In order to register, the user may insert a registration key in the keyhole 248 given above to switch to the registration mode or a dial 382 may be spun to match a particular number and to thereby bring about the registration mode.

When the safe is normally not carried, this identification device is mounted in a holder 384 on the top of the safe. In this case, if the authentication is not successful, a lock 388 at the junction between a floor 386 and the safe cannot be unlocked so that any person other than the authentic registrant cannot take the safe out.

Figure 21A:
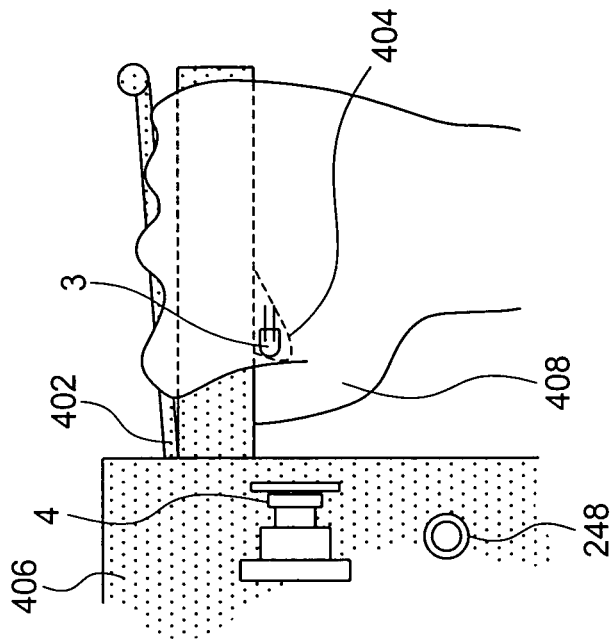
FIGS. 21A and 21B are diagrams showing an example of the construction of another grip-type finger-vein identification device that is provided on the grip of a motorbike.
Figure 21B:
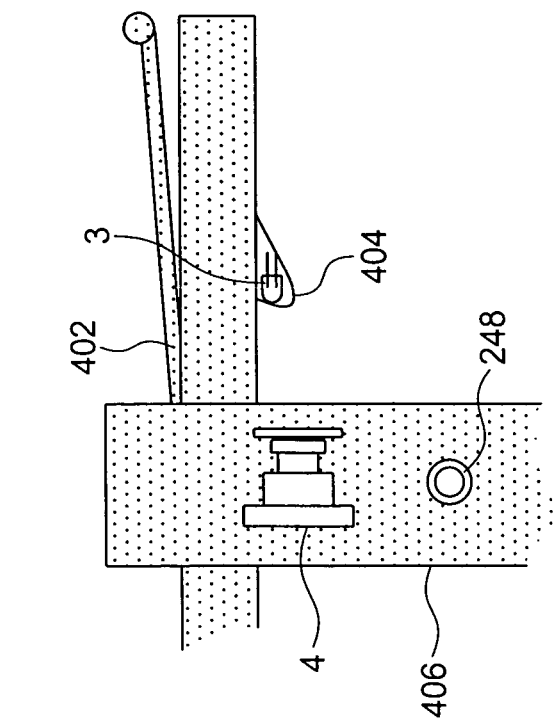

FIGS. 21A and 21B are diagrams showing an example of the construction of another grip type finger vein identification device capable of person identification by grasping the handle of a motorbike.

As illustrated in FIG. 21A, a projection 404 is provided on a handle 402, and the light source 3 is incorporated in the projection 404. The projection 404 is made of a material such as acrylic resin transparent to infrared. The projection 404 serves to support not only the light source 3 but also to position the hand when the user grasps the handle 402. The camera 4 is provided within a handle support 406 that supports the handle 404 in order to oppose the light source 3.

As illustrated in FIG. 21B, when grasping the handle 402, the user makes the inner side of the thumb 408 touch the projection 404. At this time, the light source 3 irradiates light on the palm side of the thumb 408 of the user, and the camera 4 picks up the finger vein pattern of the thumb 408 of the hand's backside. Then, the authentication process is performed. If the obtained pattern coincides with the registered one, the user can start the engine of the motorbike. This authentication process can also be used to unlock the handle lock. The authentication may be started when a sensor or the like detects that the user has grasped the handle 402 as described above.

In order to register data, under the condition that the key for registration separately prepared is inserted in the keyhole 248 provided in the handle 402, the user grasps the handle 402. Alternatively, the user may spin an input interface like a ten keypad mounted on the motorbike, to match a password and thereby to switch to the registration mode.

The above embodiment can be applied not only to the handle of the motorbike but also to the handle of a bicycle or exercise bike. Particularly in the exercise bike, such a function can be provided that, after the authentication of the user, the exercise history information of having utilized the machine in the past is read out and offered to the user.

While the veins of the right-hand thumb are used for the authentication in the above embodiment, the same device may also be provided on the left handle so that the thumbs of both hands can be used to make the authentication. Therefore, the authentication can be performed with much higher precision.

Even in any one of the above embodiments, the flow of the authentication can make use of the flow described with reference to FIG. 22. In addition, the shapes of the grips disclosed in FIG. 4 through FIG. 10B can be physically combined within a possible range. Moreover, the other shapes of the handles disclosed in FIG. 13A and the following drawings can also be combined. Also, the embodiments described with reference to FIGS. 18A and 18B can be combined with the embodiments that have other types of grips. By the combination, it is possible to more improve the precision.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A personal identification device comprising:
   a grip having a curvature configured to be grasped by a hand;
   a light source provided within said grip so as to irradiate light onto a finger of said hand;
   a camera for picking up the image of the light passed through said finger from said light source; and
   a processor for extracting a vessel pattern from said image picked up by said camera so as to identify individuals,
   wherein said camera picks up a plurality of images of a vessel pattern of said finger including a portion between a first joint and a second joint of said finger in a time series where a relative angle between said camera and said finger is varied in a longitudinal direction of said finger, from a tip of the finger toward a palm of the hand, which moves relative to said grip as said grip is grasped by said hand, and
   wherein said processor performs the personal identification on the basis of the plurality of images picked up in time series and a plurality of registered images previously registered to make a personal authentication when at least one of the plurality of registered images is identified.

2. A personal identification device according to claim 1, wherein said grip has one or more recesses which accommodate said fingers.

3. A personal identification device according to claim 2, wherein said light source is provided at a location corresponding to a central position of one of said recesses.

4. A personal identification device according to claim 1, wherein said camera is provided within a grip support for supporting said grip.

5. A personal identification device according to claim 1, wherein said camera is provided within said grip.

6. A personal identification device according to claim 5, wherein a bar for alignment of said fingers is provided to connect said grip and said grip support so that said bar can be held between the plurality of said fingers when said hand grasps said grip.

7. A personal identification device according to claim 1, wherein said grip is shaped to have a different curvature in part from that in the other part of said grip so that the tips of said fingers are inserted up to the part of said different curvature.

8. A personal identification device according to claim 1, wherein a plurality of said light sources are provided in the longitudinal direction of said fingers to be put out.

9. A personal identification device according to claim 1, further comprising a sensor to detect the pressure applied to said grip by said hand, said camera being started to pick up when said pressure is applied to said grip.

10. A personal identification device according to claim 8, wherein a plurality of said cameras are provided in the longitudinal direction of said fingers to oppose said plurality of light sources.

11. A personal identification device according to claim 1, wherein, as said hand progressively moves in the longitudinal direction of said fingers to grasp said grip, said camera picks up a plurality of successive images of vein patterns of said finger in time series so that said personal identification can be performed by using said plurality of picked-up images.

12. A personal identification device according to claim 11, wherein said processor compares each of said plurality of picked-up images with the corresponding one of the registered vein patterns so that said personal identification can be judged to be authentic, or successful when some of said picked-up images are coincident with the corresponding ones of the registered vein patterns.

13. A personal identification device according to claim 1, wherein said grip is the doorknob of a car, and said processor causes said doorknob of said car to be unlocked when it judges said personal identification to be successful.

14. A personal identification device according to claim 1, wherein said processor combines the plurality of images picked up in time series into a combined image to perform the personal identification on the basis of the combined image.

* * * * *